United States Patent [19]

Hasegawa

[11] Patent Number: 4,500,987
[45] Date of Patent: Feb. 19, 1985

[54] LOOP TRANSMISSION SYSTEM
[75] Inventor: Satoshi Hasegawa, Tokyo, Japan
[73] Assignee: Nippon Electric Co., Ltd., Tokyo, Japan
[21] Appl. No.: 443,876
[22] Filed: Nov. 23, 1982
[30] Foreign Application Priority Data Nov. 24, 1981 [JP] Japan .................................. 56-188118
May 24, 1982 [JP] Japan .................................... 57-87485
May 24, 1982 [JP] Japan .................................... 57-87486

[51] Int. Cl.³ ............................................... H04J 3/00
[52] U.S. Cl. ...................................... 370/60; 370/86; 370/94; 340/825.5
[58] Field of Search ...................... 370/60, 94, 86, 89; 340/825.05, 825.5

[56]  References Cited
U.S. PATENT DOCUMENTS

| | | | |
|---|---|---|---|
| 3,879,710 | 4/1975 | Maxemchuk et al. | 370/89 |
| 4,154,983 | 5/1979 | Pedersen | 370/84 |
| 4,156,798 | 5/1979 | Doelz | 370/94 |
| 4,168,400 | 9/1979 | de Couasnon et al. | 370/89 |
| 4,236,245 | 11/1980 | Freeny et al. | 370/89 |
| 4,237,553 | 12/1980 | Larsen | 370/89 |

OTHER PUBLICATIONS

"Performance Evaluation of a Variable Frame Multiplexer for Integrating Switched Networks", IEEE Transactions on Communications, Jun. 1981, vol. COM-29, No. 6 by B. Maglaris and M. Schwartz.
"A Digital Loop Communication System", IEEE Transactions on Communications, vol. COM-22, No. 6, Jun. 1974, by E. R. Hafner.

*Primary Examiner*—Douglas W. Olms
*Assistant Examiner*—Frank M. Scutch, III
*Attorney, Agent, or Firm*—Blakely, Sokoloff, Taylor & Zafman

[57]  ABSTRACT

In a loop transmission system in which packet communications are made among a plurality of transmission/reception terminals which are connected in a loop, a higher degree of priority is given to a real time signal packet, while a lower degree of priority is given to a data packet. A communication path in each terminal is controlled according to the degree of priority such that a packet having a higher degree of priority will not be delayed when it passes through the terminal. Further, a transmission request command signal having an intermediate degree of priority is sent for effecting a real time signal transmission as well as full dual communication. In a modified embodiment, a traffic quantity detector is provided for sending out a real time information message. In another modification, an activity control circuit is added for controlling sending out of the voice packet according to a detected traffic quantity.

7 Claims, 23 Drawing Figures

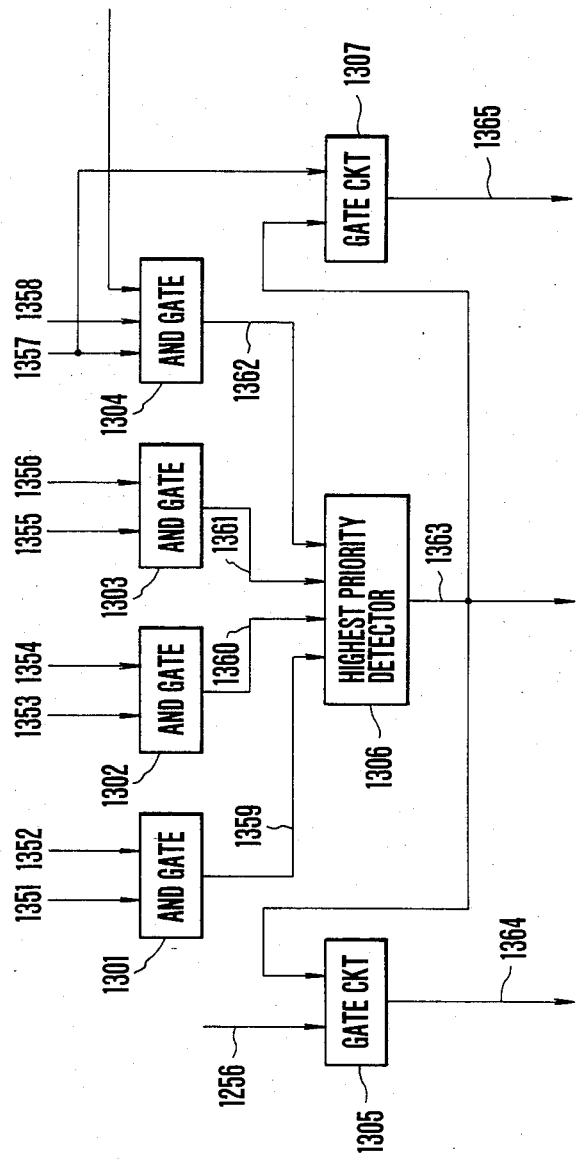
F I G. 13

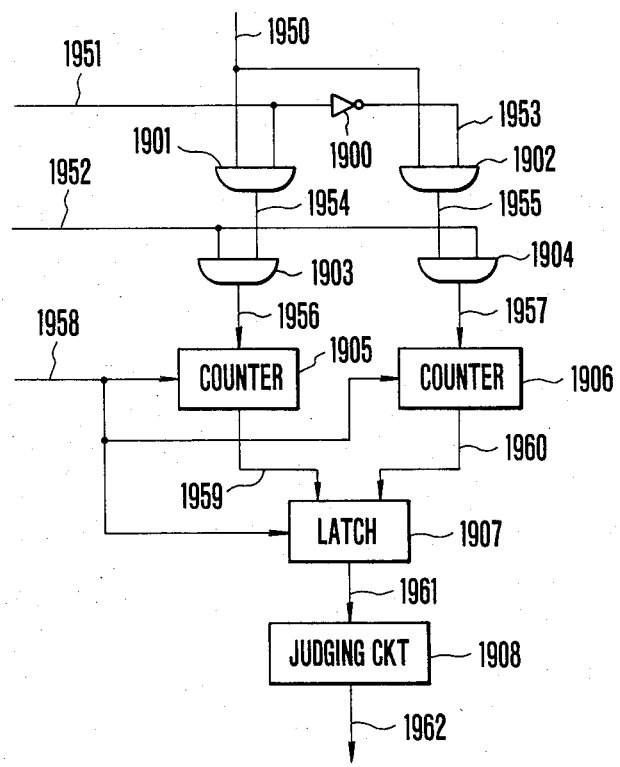
F I G. 19

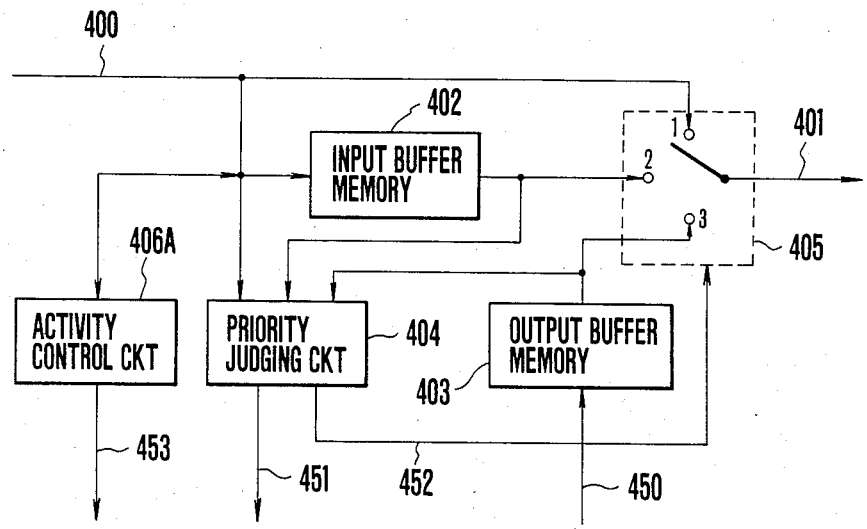
FIG.20
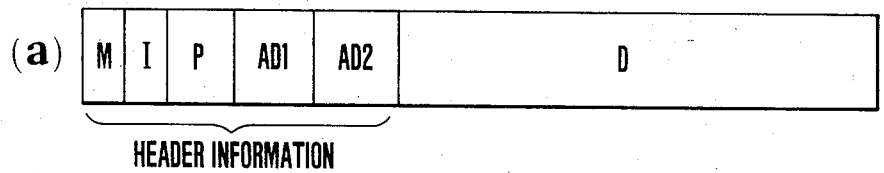
(a)
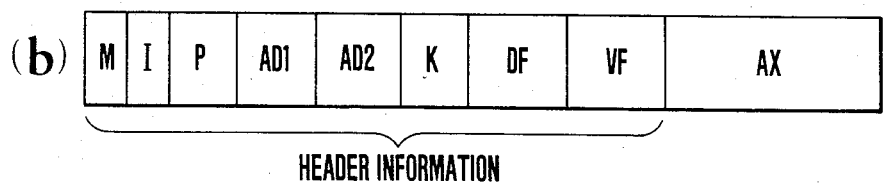
(b)
FIG.21

LOOP TRANSMISSION SYSTEM

BACKGROUND OF THE INVENTION

This invention relates to a loop transmission system in which packet communications are performed between terminals of the loop transmission system including a plurality of transmission/reception terminals and a control terminal which are connected in a loop.

A time division multiplex system utilizing a frame construction has been known as a communication system for a network including coexistent voice terminals and data terminals. This system is suitable for voice because it can assure a real time characteristic but unsuitable for data because it is difficult to readily accommodate data terminals having various speeds and because it can not accommodate high speed data terminals. As another system a packet multiplex system has been proposed in which due consideration is made for data. Although this system can be constructed as a versatile system suitable for various data speed terminals, for voice there is a delay depending upon the activity of the line thus failing to assure a real time characteristic. As an example of a signal having the real time characeristic may be mentioned a moving picture image signal in addition to the voice signal.

As an approach for improving the two systems described above, a system has been proposed in which a frame 100 is divided into two subframes 101 and 102 as shown in FIG. 1, one subframe 101 being used as a time division type subframe for voice and the other subframe 102 being used as a packet multiplexing subframe. This system, however, has a defect that its efficiency decreases when the quantity of the traffic is increased by either one of the voice and data. Thus, for example, where the quantity of traffic of the voice is large while that of the data is small, even when the data subframe is vacant or idle, it is not possible to use it for the voice, thus decreasing the utilization efficiency of the system. To cope with this problem, a system has been proposed in which a partitioning line of the frame 100 is moved according to the traffic condition, as described by B. Maglaris and M. Schwartz in a paper entitled "Performance Evaluation of a Variable Frame Multiplexer for Integrating Switched Networks", IEEE Transactions on Communications, June, 1981, Vol.COM-29, No. 6. The system described in this paper, however, requires a central control terminal that supervises the traffic state so that it is defective in that the control is extremely complicated.

As a method of efficiently transmitting and receiving voice and data signals over a loop shaped transmission line, there is a register inserting method described in E. R. Hafner's paper entitled "A Digital Loop Communication System", IEEE Transactions on Communications, Vol. COM-22, No. 6, June 1974. Each terminal utilizing this register inserting method has a basic construction including a receiving resistor 202, a transmitting register 203 and a switch 204 as shown in FIG. 2. In FIG. 2, the length of the register is equal to the packet length.

A method of control will now be described with reference to FIG. 3 in which sections (a) through (f) show states. The flows of the data on the switch are shown on the left, while the states of the switch are shown on the right. Blocks on the left showing the flow of the data on the switch represent packets and alphabets in the blocks represent packet names. Among the blocks on the right showing the switch state, block 301 designates the receiving register, block 302 the transmitting register and the alphabets in the registers designate the packet names stored therein. The switch is normally thrown to a stationary contact 1 to establish a bypass state. Suppose now that a packet A is passing through the switch and a packet B follows immediately thereafter, and that at this time a terminal requests transmission of a packet D and this request is set in the transmitting register 302. This state corresponds to section (a) in FIG. 3. When the last bit of packet A has passed through, the switch is transferred to a stationary contact 3, as shown at (b) in FIG. 3. Under this state, the transmitting packet D is sent out to the loop as shown at (c) in FIG. 3. When the switch is transferred from contact 3 to contact 2 upon completion of the transmission, the packet B has already been stored in the receiving register without being lost as shown at (d) in FIG. 3. Thereafter, the receiving register will be continuously inserted in the loop as shown at (e) in FIG. 3. If the state of section (e) in FIG. 3 continues for a long time, transmission of a new packet becomes impossible. But if the switch is transferred randomly to terminal 1, the packet now passing through the receiving register 301 will sometimes be lost. The switch may therefore be transferred when only a vacant packet is stored in the receiving register 301. Alternatively, the most simple and accurate method for transfer of the switch may be such that the switch is transferred to terminal 1 when the transmitted packet D circulates through the loop and stored in the receiving register 301. The state of transferring the switch under this state is shown at (f) in FIG. 3. By the control described above, packets pass through transmitting and receiving terminals. This register inserting method is characterized in that transmission of the packet can be made without any appreciable waiting time irrespective whether the loop is busy or not, and that exchange control can be completely dispersed. Further, the data transfer time including a waiting time at a terminal is so short that the throughput characteristic can also be improved. However, the data transfer time of this register insertion method is governed by whether the loop is busy or not so that the data transfer time is indefinite. Accordingly, this method is not suitable for voice communication.

SUMMARY OF THE INVENTION

Accordingly, it is an object of this invention to provide an improved loop transmission system capable of eliminating the defects of the prior art systems and transmitting real time signals and data with an efficient and simple control.

Another object of this invention is to provide an improved loop transmission system capable of transmitting a real time signal and data in a well matched state by an efficient and simple control.

Still another object of this invention is to provide an improved loop transmission system in which sending out of a real time signal that prevents a delay of a data packet is controlled by a system activity detected by utilizing the control packet, thus decreasing the delay of the data packet.

According to this invention, a higher degree of priority is given to a real time signal packet, while a lower degree of priority is given to a data packet and the communication path in a terminal is controlled according to the degree of priority such that a packet having a higher degree of priority will not be delayed when it passes through the terminal. Further, regarding the real time signal, for the purpose of realizing its real time transmission and full dual communication, the transmission side terminal sends out a transmission request command packet when a real time signal transmission is requested. The transmission request command packet has a lower degree of priority than the real time signal packet but a higher degree of priority than the data packet. When a reply command packet from the receiving side terminal returns back within a predetermined delay time, the real time signal packet is inserted in the same position as the reply command packet and then sent out. Thereafter, until the communication terminates, the real time signal packet is sent out at a predetermined time interval, and at the receiving side terminal the real time signal packet generated from the receiving side terminal is inserted in the same position as the real time signal packet sent from the transmission side terminal so as to establish the real time property and full dual communication of the real time signal transmission.

Where the real time signal is sent out such that the delay quantity of the data packet will not increase extremely, prior to the sending out of the real time signal, the traffic quantity passing through a terminal is measured during the repetition period of sending out the real time signal packet having a higher degree of priority so as to control the sending out of the real time signal in accordance with the measured quantity of the passing traffic, thereby transmitting the real time signal packet and the data packet in a well matched state.

According to another feature of this invention, a higher degree of priority is given to a real time signal packet, while a lower degree of priority is given to a data packet and the communication path in a transmission/reception terminal is controlled according to the degree of priority such that the packet having a higher degree of priority passes through the transmission/reception terminal without any delay. Then, as the traffic quantity of the real time signal packet increases, the delay of the data packet increases. To prevent the delay of the data packet, according to this invention, sending out of the real time signal packet is controlled according to the system activity detected by using a control packet exchanged prior to the sending out of a real time signal so as to accommodate the real time signal packet and the data packet in a well matched condition.

BRIEF DESCRIPTION OF THE DRAWINGS

In the accompanying drawings:

FIG. 13 is a block diagram showing one example of the priority selection circuit utilized in the circuit shown in FIG. 12;

FIG. 19 is a block diagram showing one example of the construction of the passing traffic quantity detecting circuit 711 shown in FIG. 18;

FIG. 20 is a block diagram showing still another modification of this invention utilizing an activity control circuit;

FIG. 21 shows one example of the construction of the packet utilized in the system shown in FIG. 20;

DESCRIPTION OF THE PREFERRED EMBODIMENTS

Figure 1:
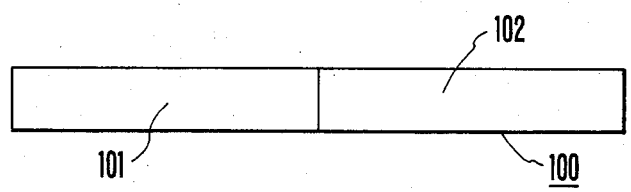
FIG. 1 is a block diagram in which one frame is divided into a time division type subframe and a multiplexing subframe.
Figure 2:
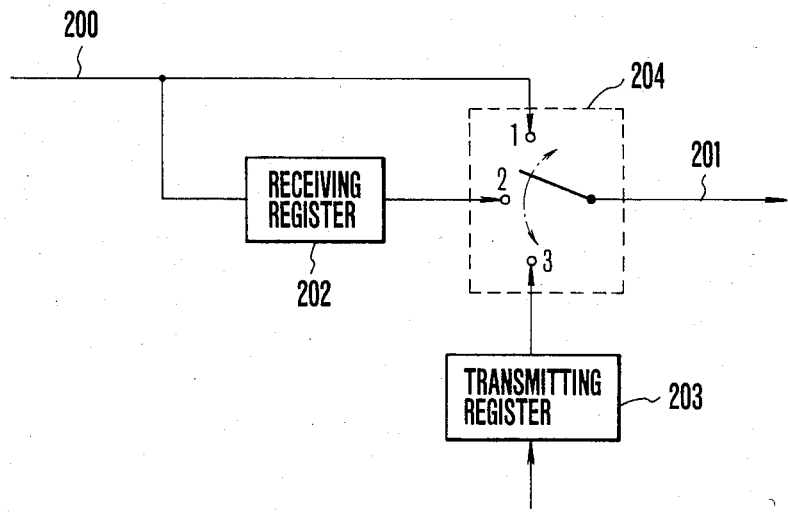
FIG. 2 is a connection diagram showing the basic construction of a terminal of a register inserting type system.
Figure 3:
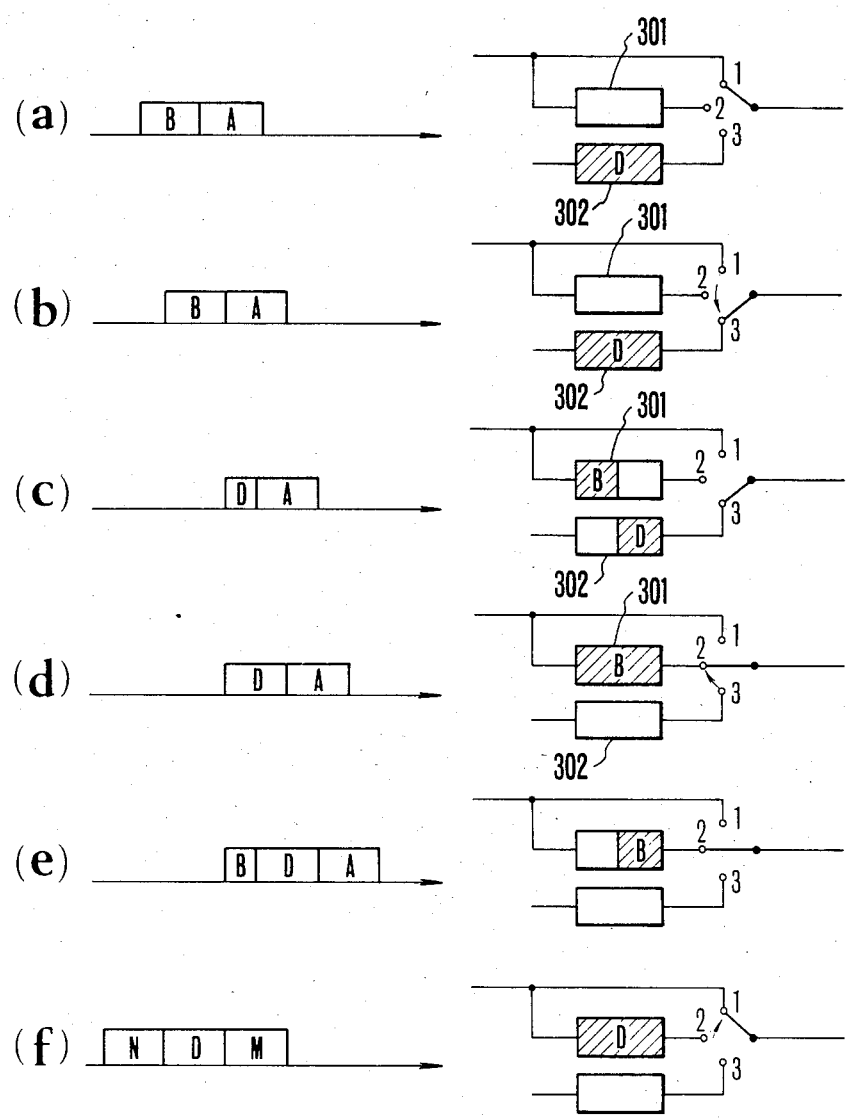
FIG. 3 is a timing chart showing a method of controlling in the register inserting type system.

The principle of this invention will be described with reference to FIG. 4. The transmission/reception terminal shown in FIG. 4 comprises an input buffer memory device 402, an output buffer memory device 403, a block 404 containing a circuit for decoding a packet address, a priority judging circuit, and a receiving circuit, and a switch 405 for selecting a communication path in the terminal. Stationary terminals of the switch 405 are designated by 1, 2 and 3. A signal on a signal line 452 is adapted to control the switch 405, while a signal on a signal line 450 represents a signal sent out from the terminal. A signal on a signal line 451 represents a signal received by the terminal. The construction of this terminal is the same as that of a voice terminal and a data terminal. A method of controlling the degree of priority will firstly be described. The method of controlling when a data packet is inputted to the output buffer memory device to produce a transmission request is as follows.

(1) A case wherein a packet having a higher priority than the data packet is inputted from a transmission line 400, or a packet is to be produced from the input buffer memory 402.

In this case, a data packet requested to be transmitted is still stored in the output buffer memory device 403 and not outputted to the transmission line. The switch 405 operates to selectively pass a packet having a higher degree of priority among the packet inputted from the transmission line 400 and the packet to be outputted from the input buffer memory device 402. When these two packets have the same degree of priority, the packet outputted from the input buffer memory device 402 will have a priority.

(2) A case in which a packet having a lower priority than a data packet requested to be transmitted is inputted from the input transmission line 400 or to be outputted from the input buffer memory device.

In this case, the data packet requested to be transmitted is sent to an output transmission line 401 from the output packet buffer memory device 403, while the input packet from the input transmission line 400 is being retired in the input buffer memory device 402.

The control after completing the transmission of the transmission data packet is performed in the following manner.

(1) A case wherein a packet inputed from the input transmission line 400 has a higher degree of priority than a packet stored in the input buffer memory device 402 (i.e., a packet waiting for being outputted).

In this case, the waiting packet stored in the input buffer memory device 402 remain stored therein, and the switch 405 is controlled such that the packet inputted from the transmission line is sent out to the output transmission line 401.

(2) A case wherein a packet inputted from the transmission line has a lower degree of priority than the waiting packet in the input buffer memory device 402.

In this case, the waiting packet stored in the input buffer memory device 402 is sent out onto the transmission line, while the input packet inputted from the transmission line 400 is stored in the input buffer memory device 402.

The aforementioned control is similarly effected for succeeding input packets from the transmission line. In an extreme case, when voice packets having a high degree of priority are continuously inputted, the data packets which have been stored in the input buffer memory device 402 remain stored as they are. But since the voice packets have the highest degree of priority, they will not be retired in the input buffer memory device in the terminal.

With reference to two examples of timing chart shown in FIGS. 5 and 6, the control operation of the terminal shown in FIG. 4 will be described as follows.

Figure 4:
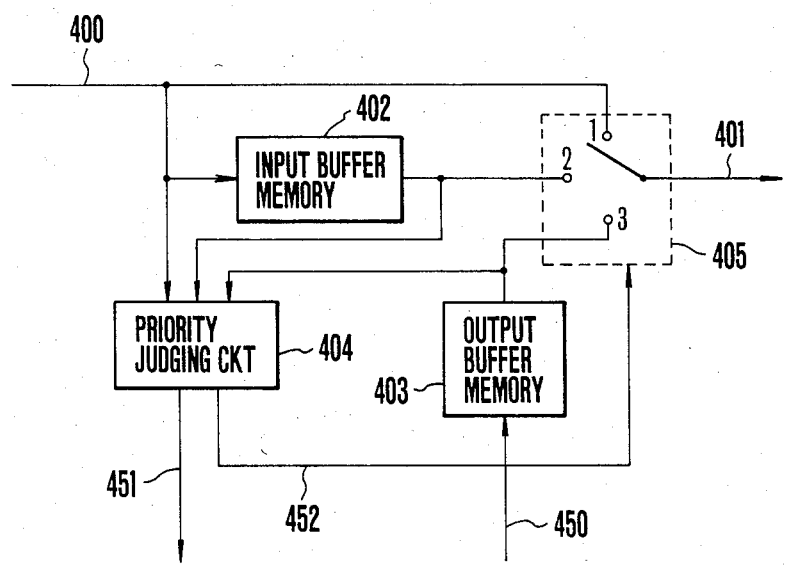
FIG. 4 is a basic block diagram showing a transmission/reception terminal embodying the invention.
Figure 5:
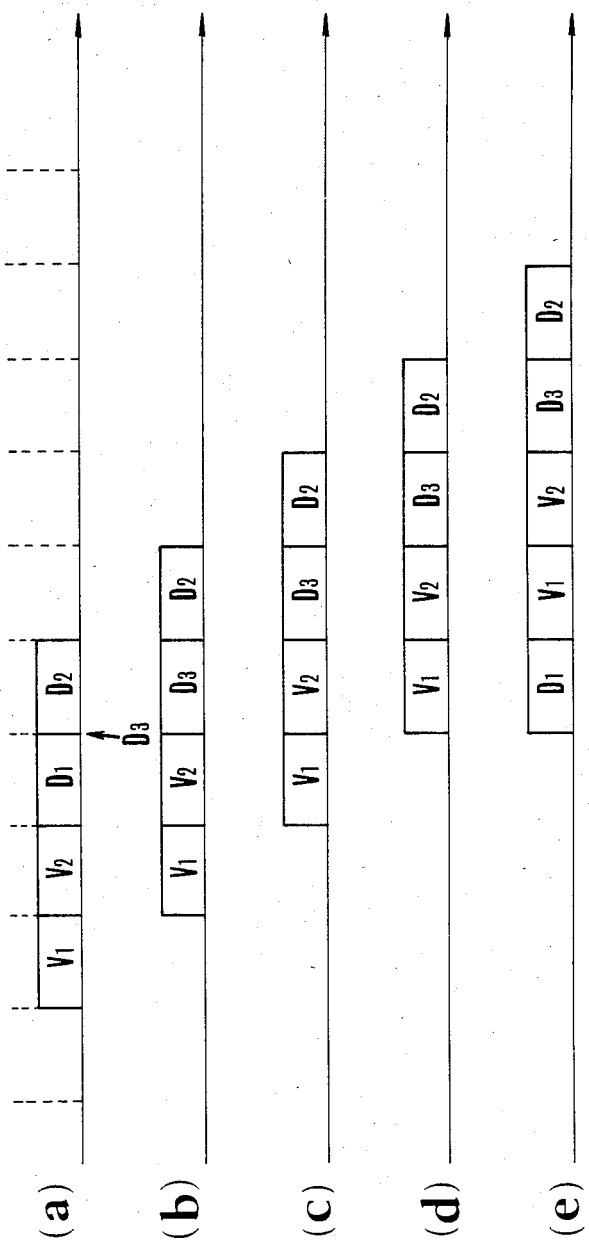
FIGS. 5 and 6 are timing charts useful to explain the transmitting system embodying the invention.

In FIG. 5, each rectangular block represents a packet and the alphabets with suffix numerals therein denote the packet names. A letter V shows a voice packet and D a data packet. It is now assumed that the voice packet has a higher degree of priority than the data packet and that all data packets have the same priority. When a transmission request of a packet D3 is made at an instant shown by an arrow shown at section (a) in FIG. 5, since packets D1 and D3 have the same priority, switch 405 is operated such that the packet D1 will be stored or retired in the input buffer memory device 402 (FIG. 4) and the packet D3 will be outputted to the transmission line 401.

FIG. 5 shows at section (b) the state of the output transmission line one packet time after the state shown at (a) in FIG. 5. At (b) in FIG. 5, the packet D1 which has been stored in the input buffer memory device 402 will remain stored in the input buffer memory device because the packet to be inputted next from the transmission line 400 is a voice packet V2 having a higher priority so that the switch 405 is controlled to send out the voice packet V2 to the output transmission line 401.

At (c) in FIG. 5 showing the state one packet time later, since the packet inputted next from the transmission line 400 is again a voice packet V1, the packet D1, which has been stored in the input buffer memory device 402 will be continously held therein, so that the switch 405 is controlled such that the voice packet V1 will be outputted to the output transmission line 401. At (d) in FIG. 5 showing the state one packet time after the state shown at (c) in FIG. 5, since a packet inputted from the transmission line 400 is a vacant packet, the switch 405 is controlled such that the packet D1 stored in the input buffer memory device 402 will be sent out to the output transmission line 401. In the state shown at (e) in FIG. 5, since a packet outputted to the transmission line 401 and inputted from the transmission line 400 is a vacant packet, and since there is no waiting packet stored in the input buffer memory device 403, the switch 405 is controlled to directly interconnect the input and output transmission lines.

The control procedure of the terminal circuit shown in FIG. 4 will be described with reference to an example shown in FIG. 6. Suppose now that at a time shown by an arrow at (a) in FIG. 6, a request for transmission of a packet D3 is made. Since packets D1 and D3 have the same priority, the switch 405 is controlled such that the packet D1 will be stored or retired in the input buffer memory device while the packet D3 will be outputted to the transmission line. In the state shown at (b) in FIG. 6, since a packet inputed from the transmission line 400 is vacant, the switch 405 will be controlled such that the packet D1 stored in the input buffer memory device 402 will be sent out in the output transmission line 401. In the state shown at (c) in FIG. 6, since a packet inputted from the transmission line 400 is a voice packet V1, the switch 405 is controlled to directly interconnect the input and output transmission lines 400 and 401, whereby the data packet D1 and the voice packet V1 will form a continuous packet as shown in the drawing. As can be noted from the examples shown in FIGS. 5 and 6, there is a case wherein the data packet may be preceded by the voice packet, thus increasing a delay. However, there is no delay in the voice packet at the terminal. More particularly, a voice packet once sent out to the transmission line will reach a desired terminal without being delayed by the buffer memory device. However, in order to maintain the real time characteristic of a voice, it is necessary to always send out the voice packets from a given terminal at a predetermined interval. Unless this condition is satisfied, at the time of sending out a voice packet, a voice packet from another voice terminal may pass through the terminal of interest so that the voice packet to be sent out will be brought into a waiting state in the terminal, thus resulting in a time delay.

Considering a voice transmission as in a telephone system or the like, it is necessary to establish a full dual communication which is performed by causing the voice terminal on the transmission side to reserve time slots for one packet, and by causing the voice terminal on the receiving side to extract a voice packet sent from the voice terminal on the transmission side, to insert a voice packet generated at the voice terminal on the receiving side in the same packet position, and to send back the voice packet through a portion of the loop on the opposite side.

Figure 7:
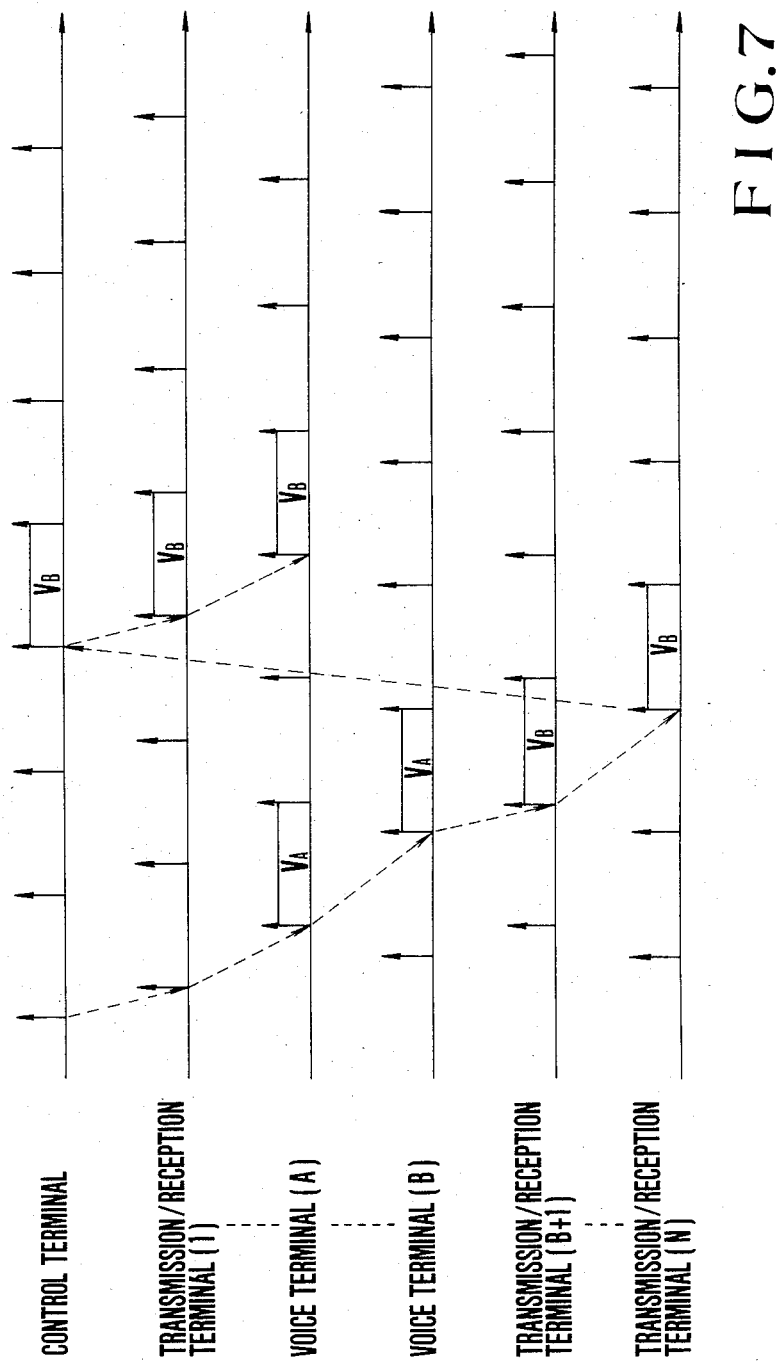
FIG. 7 is a timing chart showing a case in which a full voice duplicate transmission is made according to this invention.

FIG. 7 shows a timing chart of a case wherein a full dual communication is performed between two voice terminals A and B. It is considered herein that the voice terminal A is on the transmission side and the voice terminal B is on the receiving side. In FIG. 7, arrows show signals indicative of the starting positions of respective packets generated at a control terminal. A voice packet $V_A$ inserted at the terminal A arrives at the voice terminal B after being delayed by the transmission line. At the voice terminal B, the voice packet $V_A$ is extracted and a voice packet $V_B$ is inserted into the same packet position to send the voice packet $V_B$ to the voice terminal A via the opposite side of the loop. At the voice terminal A, the voice packet $V_B$ is extracted. In this manner, the full dual communication is executed.

Figure 8:
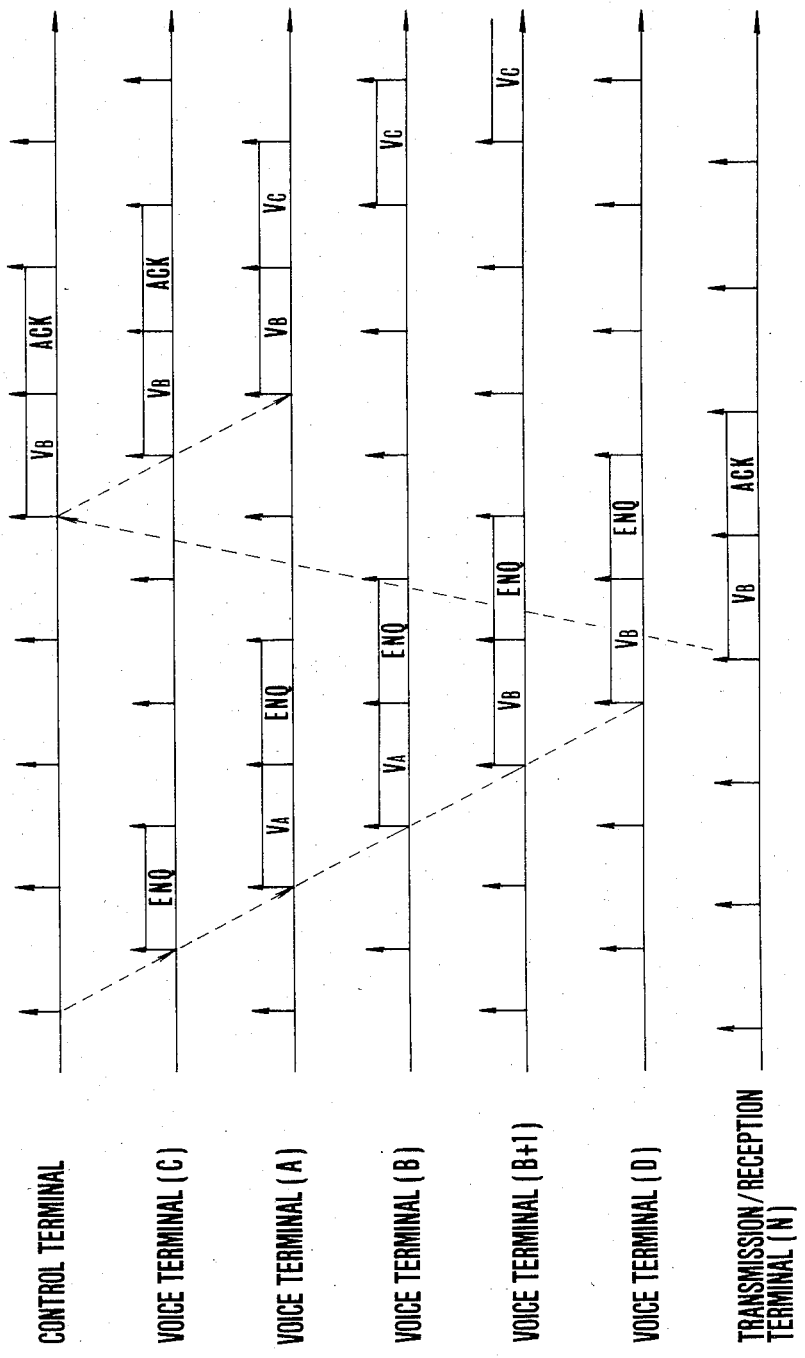
FIG. 8 is a timing chart useful to explain the fact that a voice packet can be sent out without any delay during the transmission of the voice packet.

With reference to FIG. 8, a method of sending out voice packets from a transmitting terminal at a predetermined interval will now be described. Suppose now that the voice terminals A and B are in a talking condition and that the voice terminal A is on the transmission side. Furthermore, it is assumed that a voice packet sent from the voice terminal A to the voice terminal B is designated by $V_A$, and that a voice packet sent from the voice terminal B to the voice terminal A is designated by $V_B$. Furthermore, it is assumed that a request for transmitting a voice to a voice terminal D is generated in a voice terminal C under this state, and that the voice terminal C has sent out a voice transmission request packet (ENQ packet) to the voice terminal D. In this case, the voice packet $V_A$ and the ENQ packet collide with each other at the voice terminal A. However, when the priority of the packet ENQ is selected such that it is lower by one level than that of the voice packet but higher than that of an ordinary data packet, the ENQ packet will be stored and retired in the buffer memory device in the voice terminal A during the transmission of the packet $V_A$ from the voice terminal A and then pass through the voice terminal A after being delayed by one packet. After that, the voice packet $V_A$ is extracted at the voice terminal B and the voice packet $V_B$ from the voice terminal B is inserted in the same packet position so as to be sent out to the loop transmission line. Also the ENQ packet is extracted at the voice terminal D and an ACK packet having the same degree of priority as the ENQ packet and indicating that the voice terminal D is ready for transmission is inserted in the same packet position so as to be sent out to the loop transmission line. The ACK packet is extracted from the voice terminal C, and the voice packet $V_C$ at the voice terminal C is inserted into the same packet position as the ACK packet and then sent out to the loop transmission loop. In this manner, the packet position of the voice terminal at which the transmission request has been made is determined. Thereafter, the voice packets are sent out at a predetermined interval, and this packet position does not collide with the packet position between the voice terminals A and B. This means that a fixed channel is ensured during talking.

FIG. 8 shows one example of a case in which only two voice terminals are talking. The same consideration can be applied to a case where a plurality of terminals are talking, thus making it possible to determine the position of the transmitting voice packets by using the ENQ and ACK packets. Although the delay until the ACK packet returns increases (in the example shown in FIG. 8, a delay equal to the sum of the delay during transmission through the transmission line and the delay corresponding to one packet), this delay corresponds to the number of talking voice packets and the amount of delay suggests the activity of the voice, so that so long as the delay is within a predetermined interval, it is assumed that a channel is secured to commence talking. As described above, an equivalent channel can be secured by exchanging only once the ENQ packet and the ACK packet at the commencement of the talking, thus enabling sending out of the voice packets at a definite interval.

Figure 15:
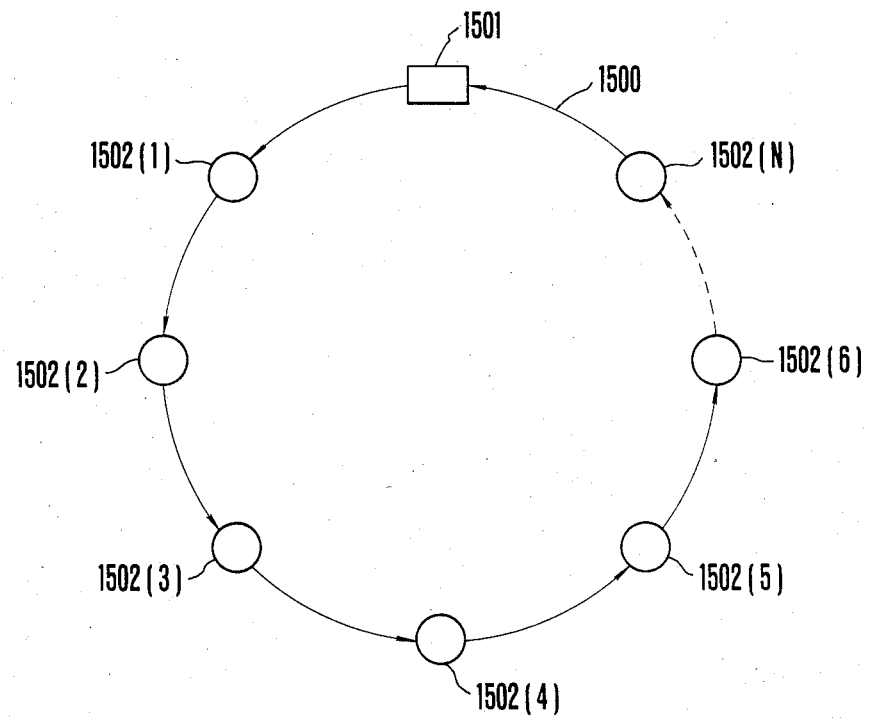
FIG. 15 is a block diagram showing the construction of the system to which the invention is applicable.

FIG. 15 shows a basic construction of the loop transmitting system of this invention in which signals flow through a transmission line 1500 in a direction shown by arrows. Control terminal 1501 periodically produces signals showing the leading positions of the packets when they are transmitted between transmission/reception terminals 1502 (1) through 1502 (N) and establishes a loop synchronization such that the delay time of the packets introduced while they circulate through the loop will be equal to an integer multiple of the packet length. Various apparatus and devices are connected to respective transmission/reception terminals.

Figure 10:
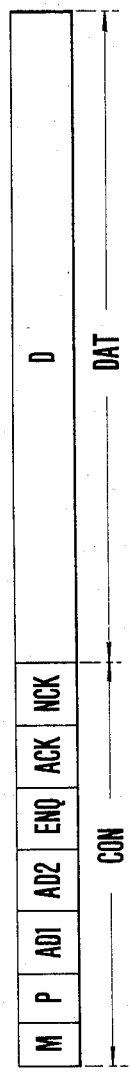
FIG. 10 shows one example of the construction of the packets utilized in this invention.

FIG. 10 shows a packet construction utilized in the system shown in FIG. 15. In FIG. 10, M represents a marker bit. When it is "1" it shows a used packet, whereas when it is "0", it means a vacant packet. P represents priority information and assigned with a bit number corresponding to the type of the priority of a terminal contained in the system. AD1 shows transmission address information, and AD2 shows received address information. ENQ shows a one bit signal which becomes "1" when a transmission request occurring on the transmission side is informed to a terminal on the receiving side. Each ACK or NCK is a one bit signal wherein when the receiving terminal confirms the reception of the ENQ signal sent from the transmission side the signal ACK becomes "1", whereas when the signal reception is rejected, the signal NCK becomes "1". CON shows header information and DAT shows data.

Figure 9:
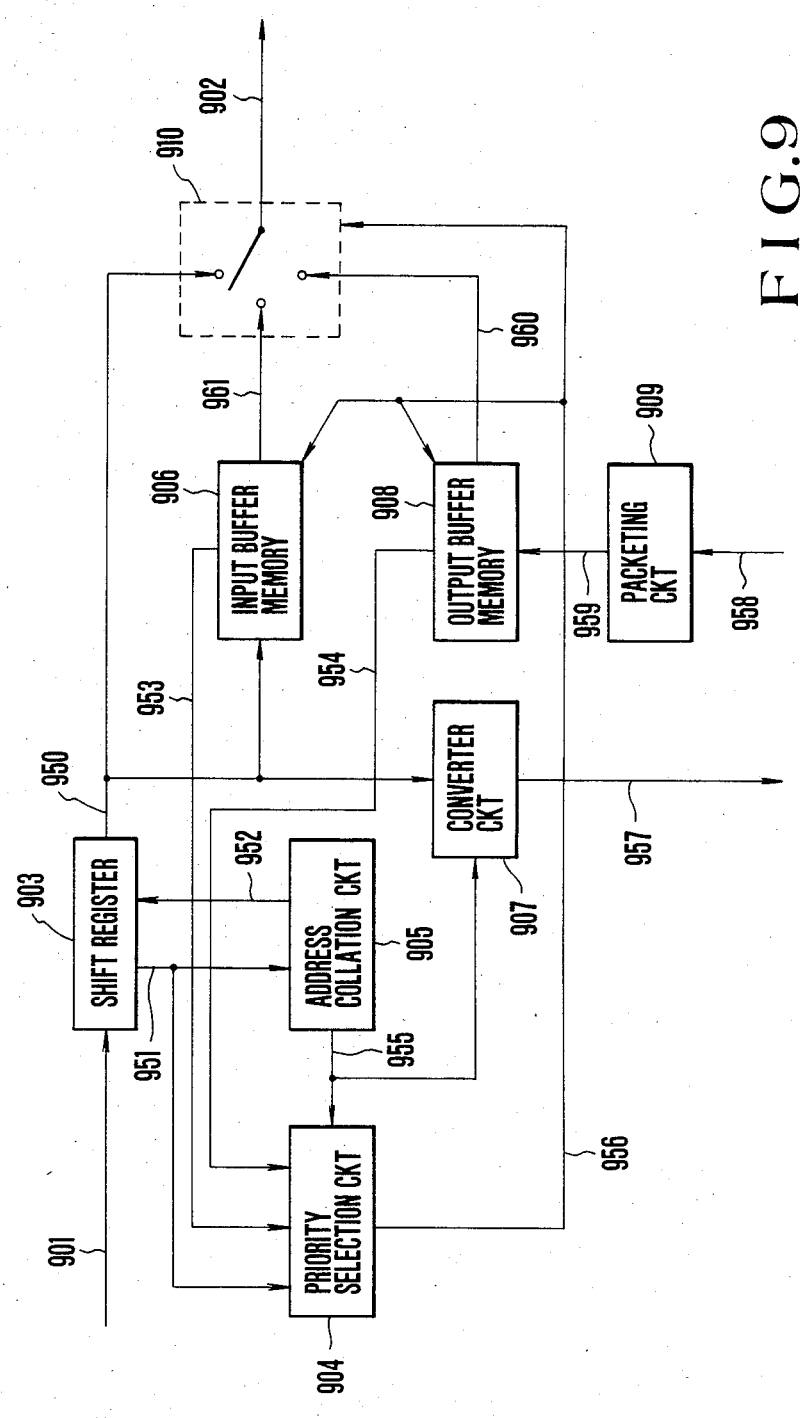
FIG. 9 is a block diagram showing a transmission/-reception unit at a data terminal according to this invention.

FIG. 9 shows a block diagram of the transmission/reception unit of a data terminal utilized in the system shown in FIG. 15. In FIG. 9, an input packet from an input transmission line 901 is applied to a shift register 903. The shift register 903 is provided with a serial input terminal and two types of the output terminals, i.e., serial and parallel, and has the same length as the header length of one packet. The header information in the shift register 903 is supplied to a signal line 951 through a parallel output terminal as parallel information. A receiving address in the header information is given to an address collation or a comparison circuit 905, while a marker bit and priority information are applied to a priority selection circuit 904. While passing through the shift register 903, the input packet is subjected to a delay corresponding to the header length. The address collation circuit 905 can be readily fabricated with an exclusive OR gate circuit and compares the received address of the input packet with the address of the terminal to send out a coincidence or non-coincidence signal to a signal line 955. When the received address and the address of the terminal coincide with each other, since the input packet is determined as a packet to be received by the terminal, it is necessary to erase the marker bit of the input packet to make it a vacant packet. To this end, the address collation circuit 905 outputs a marker erasing signal to a signal line 952. In response to this marker erasing signal, a marker bit contained in the header information stored in the shift register 903 is erased. The priority selection circuit 904 outputs a signal that selects a packet having the highest degree of priority and a state signal indicative of a control signal for an input and output buffer memory devices to a signal line 956 based on the marker bit of the input packet applied through the signal line 951, priority information, a marker bit and a priority information of a waiting packet stored and retired in an input buffer memory device 906, and a marker bit and priority information of a packet sent out from an output buffer memory device 908. A converter circuit 907 converts packet signals into information signals suitable for various machines and apparatus connected to the terminal. More particularly, when an input packet is applied through signal line 950, and when the output signal on the signal line from 955 the address collation circuit 905 is a coincidence signal, the converting circuit 907 sends an information signal to various machines and devices connected to the data terminal via a signal line 957. Information signals from the apparatus and devices connected to the data terminal are applied to a packeting circuit 909 through a signal line 958 where they are added with header information and converted into packets of a predetermined size which are sent out to a signal line 959. The signals on this signal line are stored in the output buffer memory device 908 to wait for being sent out to the transmission line through a signal line 960. Whether the signal is sent out or not to the transmission line through the signal line 960 is controlled by the state signal of the signal line 956. Of the header information of the packet stored in the output buffer memory device 908 and waiting for being sent out next, the marker bit and the priority information are outputted to a signal line 954. The input buffer memory device 906 temporarily stores and retires a packet among the input packets from the signal line 950, that is not selected by a switch 910 to be sent to an output transmission line 902. Whether the information is to be stored and retired or not in the input buffer memory device 906 and whether the information is to be sent out or not to the output transmission line 902 from the input buffer memory device 906 are controlled by the state signal of the signal line 956. Among the header information of the delayed packet stored in the input buffer memory device 906, the marker bit and the priority information are outputted to a signal line 953. The switch 910 is controlled by the state signal from the signal line 956 such that it selects a packet having the highest degree of priority among an input packet from the signal line 950, a delay packet from a signal line 961, and a transmission packet sent out from the signal line 960.

Figure 11:
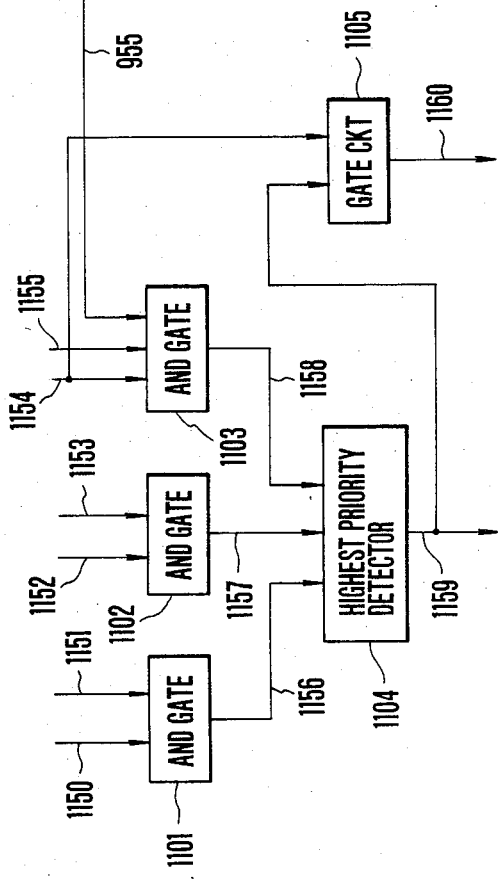
FIG. 11 is a block diagram showing one example of a priority selection circuit utilized in the circuit shown in FIG. 9.

FIG. 11 shows details of the priority selection circuit 904 shown in FIG. 9. In FIG. 11, signal line 1150 and 1151 represent the marker bit and priority information on the signal line 954 outputted from the output buffer memory device 908 shown in FIG. 9. In the same manner, signal lines 1152 and 1153 pass the market bit and priority information outputted from the input buffer memory device 906, while signal lines 1154 and 1155 show the marker bit and the priority information of the input packet from the transmission line. AND gate circuits 1101 and 1102 produce logic products of respective bits of the inputted marker bit and the priority information. For example, when the marker bit is "1", the output signals of the AND gate circuits are the same as the input priority information, whereas when the marker bit is "0" the output signals of the AND gate circuits are "0". In addition to the marker bit and the priority information, the AND gate circuit 1103 is inputted with an address coincidence signal from the signal line 955 so as to obtain a logic product of the address coincidence signal, the marker bit and respective bits of the priority information. For example, when the address coincidence signal on the signal line 955 is "1" (that is the received address of the input packet does not coincide with the terminal address), the signal on a signal line 1158 is the same as the input priority information, whereas when the address coincidence signal is "0" (that is when the received address of the input packet coincides with the terminal address) or when the marker bit is "0", signals on the signal line 1158 are all "0". Signals on the signal lines 1156, 1157 and 1158 are inputted to the priority detection circuit 1104, and a code indicative of an input having the highest priority is outputted on the signal line 1159 as a two bit signal for one packet time, during which the two bit signal maintains the same state. The signal on the signal line 1159 is used as the control signal for the switch 910 shown in FIG. 9 and as the output control signal of the input and output buffer memory devices 906 and 907. A signal indicative of the marker bit of the input packet on the signal line 1154 and the signal on the signal line 1159 are inputted to a gate circuit 1105. When the input packet presents (the marker bit on the signal line 1154 is "1") and the switch is not selected so as to cause the signal on the signal line 1159 to output the input packet to the output transmission line, an input packet accummulation instruction to the input buffer memory device 906 shown in FIG. 9 is produced on a signal line 1160. Signals on signal lines 1159 and 1160 correspond to the signals on line 956.

Figure 12:
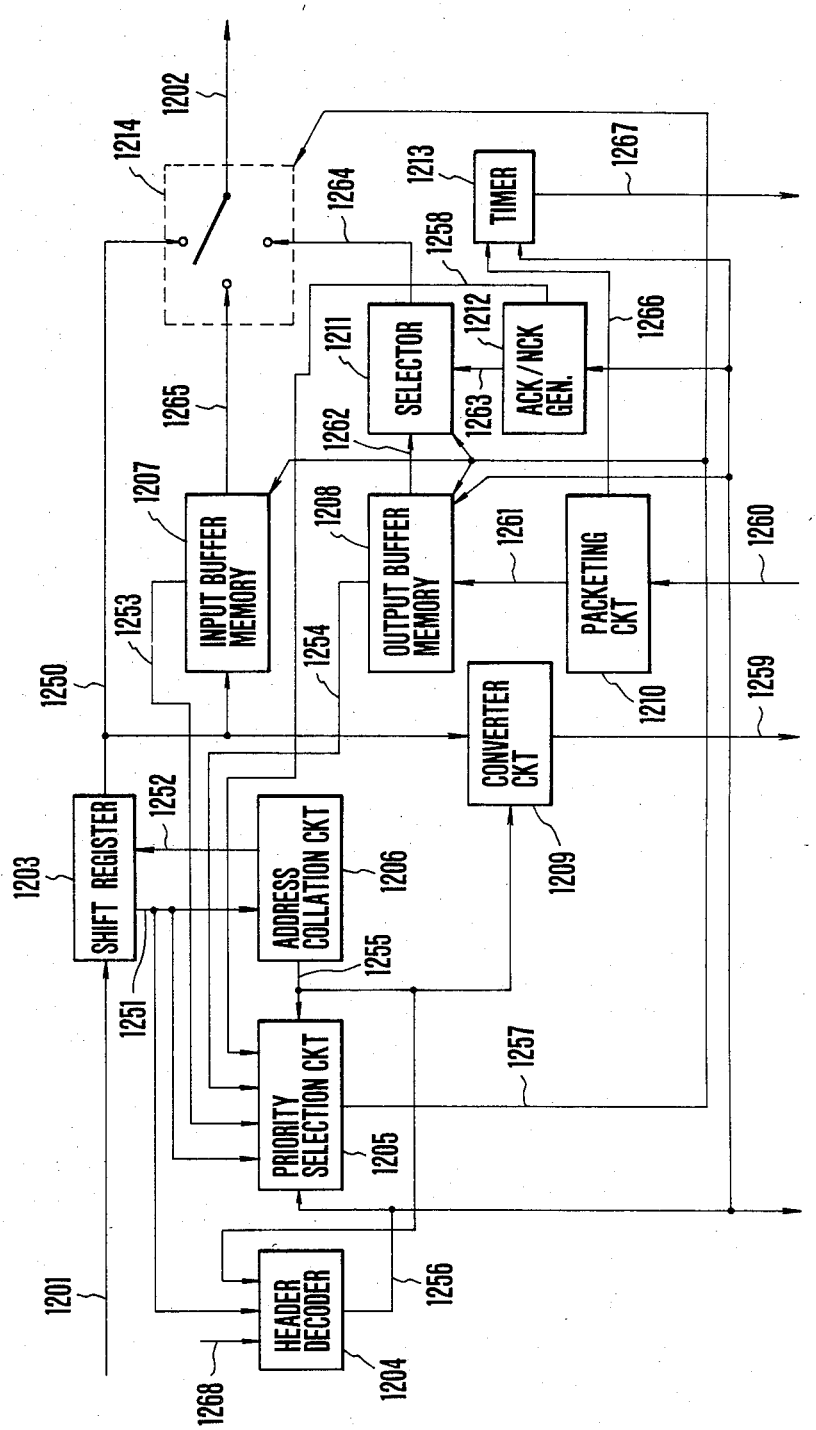
FIG. 12 is a block diagram showing one example of the transmission/reception unit of a voice terminal embodying the invention.

FIG. 12 is a block diagram showing the transmission/reception unit of a voice terminal for transmitting and receiving a voice packet. The fundamental structure of a voice terminal is shown in FIG. 9. In FIG. 12, an input packet from an input transmission line 1201 is applied to a shift register 1203 which is of the serial input type and has two types of output terminals, i.e., serial and parallel. The shift register has the same length as the header length of one packet. The header information in the shift register 1203 is outputted onto a signal line 1251 as parallel information, and the receiving address in the header information is applied to an address collation circuit 1206. A marker bit and a priority information are inputted to a priority selection circuit 1205. On the other hand, signals ENQ, ACK and NCK are inputted to a header decoder 1204. The input packet is delayed by a time corresponding to the header length while it passes through the shift register 1203. The address collation circuit 1206 can be readily fabricated with an exclusive OR gate circuit and it compares the received address of the input packet with the address of the terminal to produce a coincidence or non-coincidence signal on a signal line 1255. When the received address coincides with the terminal address, the input packet is the packet received by the terminal, so that the address collation circuit 1206 outputs a marker erasing signal to a signal line 1252 because it is necessary to erase the marker bit of the input packet to render it to be vacant. In accordance with the signal on the signal line 1252 the marker bit of the header information stored in the shift register 1203 is erased. To the priority selection circuit 1205 are applied the marker bit and the priority information of the input packet, the marker bit and the priority information of the delayed packet stored and retired in an input buffer memory device 1207, the marker bit and the priority information ACK of the voice packet sent out from an output buffer memory device 1208, the marker bits and the priority information of the packets ACK and NCK outputted from an ACK/NCK generator 1212, the coincidence and noncoincidence signals from the signal line 1255, and the control signal from a signal line 1256. The priority selection circuit 1205 outputs a signal that controls a switch 1214 such that a packet having the highest degree of priority will be outputted to the output transmission line, a control signal for input and output buffer memory devices 1207 and 1208 and a control signal to a selector 1211 which selects either one of the packet from the output packet memory device 1208 and a packet from the ACK/NCK generator 1212, and these signals are outputted to a signal line 1257.

At the time of transmitting and receiving a voice packet, for the purpose of assuring the real time characteristic of the voice packet and the full dual communication, the receiving side voice terminal is required to insert an ACK packet or an NCK packet at the packet position of a received ENQ packet and to send back the ACK or NCK packet to the terminal at the transmission side.

Upon receipt of the ACK packet, the voice terminal on the transmission side enters into a talking state, inserts a voice packet at that packet position and thereafter transmits the voice packets at a predetermined interval. The voice terminal on the receiving side receives the voice packet sent from the transmission side and inserts a voice packet in the packet position for sending back the voice packet. To the header decoder 1204 are applied header information from the shift register 1203, coincidence and noncoincidence signals from the address collation circuit 1206, and a state signal of the voice terminal from a signal line 1268. Upon detection of an ENQ packet on the receiving side (which can be determined by only the header information), the decoder 1204 sends to the ACK/NCK packet generator 1212 via the output signal line 1256 a start signal that establishes the marker bit of the ACK or NCK packet in accordance with the state of the voice terminal on the receiving side and address information. The decoder 1204 also applies a control signal to the priority selection circuit 1205 over the signal line 1256. Upon receipt of a voice packet during talking, the voice terminal on the receiving side sends voice packet receipt information to the output buffer memory device 1208 through the signal line 1256 for the purpose of inserting a voice packet in the same packet position as that of the received voice packet and sending back the voice packet. The received information is used as a signal for forming the marker bit of the waiting voice packet. At the voice terminal on the receiving side, when the header decoder 1204 receives an ACK packet, ACK packet receipt information is sent to the output buffer memory device 1208 via signal line 1256 to establish the marker bit of the waiting voice packet so as to control the priority selection circuit 1205 such that it sends out a voice packet. A converter circuit 1209 converts a packetized voice signal into a voice signal suitable for a voice device connected to the terminal. The converter circuit 1209 is applied with the input packet from a signal line 1250 and sends the voice signal to the voice device over a signal line 1259 when the output signal of the address collation circuit 1206 is a coincidence signal. The voice signal from the voice device is supplied to a packeting circuit 1210 through a signal line 1260 to be applied with header information to form a packet of a predetermined size which is outputted to a signal line 1261. The signal on this line is stored in the output buffer memory device 1208 to wait for being sent out to the transmission line. Among the header information of the packet stored in the output buffer memory device 1208, the marker bit information and the priority information are outputted to a signal line 1254. An output line 1262 of the output buffer memory device 1208 is connected to a selector 1211 which selects either one of a packet from the output buffer memory device 1208 and a packet from the ACK/NCK generator 1212 in accordance with a control signal on the control line 1256. Among the header information of the packet from the ACK/NCK generator 1212, the marker bit information and the priority information are applied to the priority selection circuit 1205 via a signal line 1258. The input buffer memory device 1207 temporarily stores and retires the packets not sent out to the output transmission line by the switch 1214 among the input packets from the signal line 1250. Whether the packets are to be stored and retired or not in the input buffer memory device 1207 or whether the packets can be sent out or not to the transmission line 1202 from the input buffer memory device 1207 via signal line 1265 is controlled by a control signal on the signal line 1257. Among the header information of the delayed packet stored in the input buffer memory device 1207, the marker bit information and the priority information are outputted to a signal line 1253. The switch 1214 selects communication channels in the terminal. The switch 1214 is controlled by a control signal on the signal line 1257 such that it selects a packet having the highest degree of priority among the input packet from the signal line 1250, the delayed packet from the signal line 1265, and the sent out packet from a signal line 1264. In the case of a transmitting voice terminal, a timer 1213 measures an interval between a time at which a signal indicative of the sending out time of the ENQ packet is inputted from a signal line 1266 and a time at which a signal representing the time when the ACK packet has been sent back from the signal line 1256 is inputted. When the interval exceeds a predetermined value, the timer 1213 sends a time out signal to the voice device via a signal line 1267.

FIG. 13 shows details of the priority selection circuit 1205 shown in FIG. 12. In FIG. 13, signal lines 1351 and 1352 represent the marker bit and the priority information respectively outputted from the ACK/NCK generator 1212 shown in FIG. 12, whereas signal lines 1353 and 1354 respectively represent the marker bit and the priority information outputted from the output buffer memory device 1208 shown in FIG. 12. Signal lines 1355 and 1356 respectively represent the marker bit and the priority information outputted from the input buffer memory device 1207 shown in FIG. 12, while signal lines 1357 and 1358 respectively represent the marker bit and the priority information of the input packet inputted from the signal line 1251 shown in FIG. 12. AND gate circuits 1301, 1302 and 1303 produce logical products of respective bits of the marker bit and the priority information inputted, and output the logical products to signal lines 1359, 1360 and 1361 respectively. For example, when the marker bit is "1", the output signals of the AND gate circuits are the same as the input priority information, whereas when the marker bit is "0", the output signals of the AND gate circuits are all "0". In addition to the marker bit and the priority information, an address coincidence signal is applied to one input of the AND gate circuit 1304 from the signal line 1255 to produce logical products of the respective bits of the address coincidence signal, the marker bit and the priority information. For example, when the address coincidence signal on the signal line 1255 is "1" (that is the received address of the input packet does not coincide with the terminal address) and when the marker bit is also "1", the signal on a signal line 1362 is the same as the input priority information. On the other hand, when the address coincidence signal is "0" (i.e., the received address of the input packet coincides with the terminal address) or the marker bit is "0", signals on the signal line 1362 are all "0". Signals on signal lines 1359, 1360, 1361 and 1362 are inputted to a highest priority detecting circuit 1306 so that a code representing an input of the highest priority is outputted to a signal line 1363 as a two bit signal while maintaining the same state during one bit time. A signal on the signal line 1363 is utilized as the control signal of the switch 1214, and the output control signal of the input and output buffer memory device 1207 and 1208 shown in FIG. 12. A signal on the signal line 1357 and indicative of the marker bit of the input packet, and a signal on the signal line 1363 are inputted to a gate circuit 1307. Where the input packet presents (that is the marker bit on the signal line 1357 is "1") and where the signal on the signal line 1363 does not select the switch such that it outputs the input packet to the output transmission line, the gate circuit 1307 outputs to a signal line 1365 a signal that stores and retires the input packet in the input buffer memory device 1207. An ENQ packet reception signal from the signal line 1256 and the signal on the signal line 1363 are inputted to another gate circuit 1305. When the ENQ packet is received, and where the packet generated by the ACK/NCK generator 1212 has the highest degree of priority, the gate circuit 1305 produces, on a signal line 1364, a signal that controls the selector 1211 such that it outputs a signal on the signal line 1263 to the signal line 1264. Signals on signal lines 1363, 1364 and 1366 correspond to the signals on the signal line 1257 shown in FIG. 12.

Figure 14:
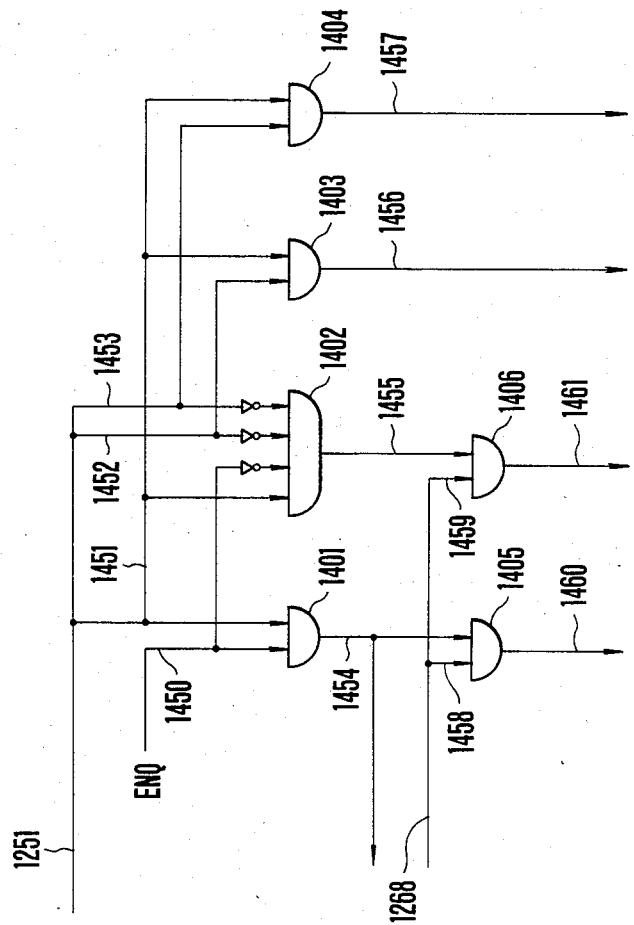
FIG. 14 is a connection diagram showing one example of a header decoder utilized in the circuit shown in FIG. 12.

FIG. 14 shows details of the construction of the header decoder 1204 shown in FIG. 12. In FIG. 14, the marker bit of the header information from the signal line 1251 is applied to one input of respective AND gate circuits 1401-1404. To the other input of the AND gate circuit 1401 is applied the ENQ signal from a signal line 1450 so that this AND gate circuit produces a logic product of the two input signals on a signal line 1454. The output of the AND gate circuit 1401 is used as a signal for establishing a marker bit of the packet from the ACK/NCK generator 1212 shown in FIG. 12 and as a signal supplied to the priority selection circuit 1205 shown in FIG. 12. The output of the AND gate circuit 1401 is also applied to one input of an AND gate circuti 1405. A terminal busy signal among the state signals of the voice terminal sent over the signal line 1268 is applied to the other input of the AND gate circuit 1405, and this AND gate circuit produces a logic product of both input signals on a signal line 1460. The output of the AND gate circuit 1405 is supplied to the ACK/NCK generator 1212 shown in FIG. 12 to act as a selection signal of the ACK/NCK packet for the ENQ packet at the receiving terminal. For example, if the receiving terminal is not in the busy state, the ACK/NCK generator 1212 will be controlled such that the ACK packet is sent back to the ENQ packet from the transmitting terminal. The AND gate circuit 1402 is provided for the purpose of detecting the arrival of a voice packet and is inputted with an inverted signal of the ENQ signal on signal line 1450, an inverted signal of the ACK signal from signal line 1452, an inverted signal of the signal NCK from a signal line 1453 and the marker bit from the signal line 1451 so that the AND gate circuit 1402 produces a logic product of these input signals on a signal line 1455. The output signal of the AND gate circuit 1402, and a signal indicative of a received voice terminal among the voice terminal state signals applied over a signal line 1459 are inputted to an AND gate circuit 1406 which produces a logic product of the two input signals on a signal line 1461. The output signal from the AND gate circuit 1406 is supplied to the output buffer memory device 1208 shown in FIG. 12 to act as a voice packet arrival signal at the receiving terminal for establishing a marker bit of a waiting voice packet in this buffer memory device. A logic product of the ACK signal from the signal line 1452 and the marker bit from the signal line 1451 is obtained by the AND gate circuit 1403, and the logic product is applied to a signal line 1456. The output signal from the AND gate circuit 1403 is supplied to the output buffer memory device 1208 shown in FIG. 12 to act ACK signal reception information at the transmitting terminal so as to establish a marker bit of a waiting voice packet. A logic product of the NCK signal on signal line 1453 and the marker bit on signal line 1451 is produced by the AND gate circuit 1404 and outputted onto a signal line 1457. The output signal from the AND gate circuit 1404 indicates that the receiving side is in the busy state which is informed to the voice device. In FIG. 14 signals on the signal lines 1454, 1460, 1461, 1456 and 1457 correspond to the signals on the signal line 1256 shown in FIG. 12.

As described above, a voice packet is given with a higher degree of priority, while a data packet a lower degree of priority so that the voice packet having the higher degree of priority can be sent without delay. Furthermore, according to this invention, control is disperses so that the real time property of the voice and the full dual transmission can be assured.

Although in the foregoing description, packets having three types of priorities, i.e., a voice packet, a data packet and a packet for determining the procedure of communicating voices were used, it will be clear that the degree of priority can be more finely classified according to the characteristic of the information sources.

Figure 16:
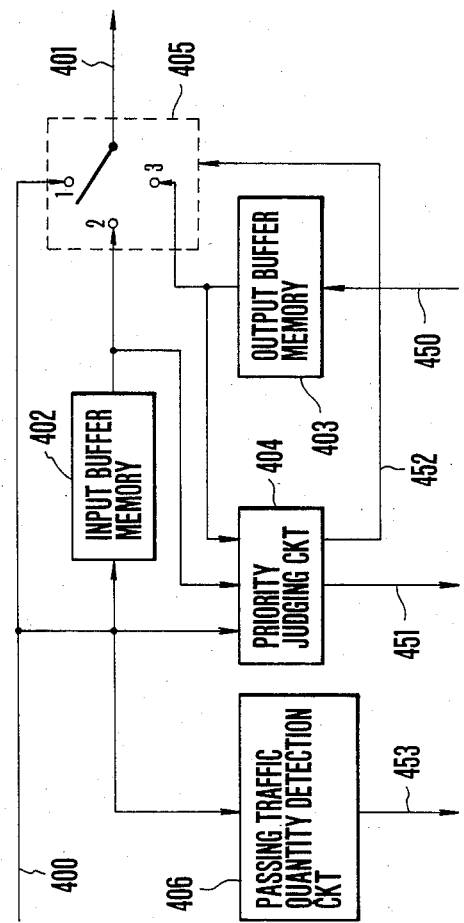
FIG. 16 is a block diagram showing a modification of the system shown in FIG. 4.

FIG. 16 shows a modification of FIG. 4 which is different from that shown in FIG. 4 except a traffic quantity detection circuit 406 so that the element corresponding to those shown in FIG. 4 are designated by the same reference numerals.

The operation of the modification shown in FIG. 16 is the same except for that of the traffic quantity detection circuit. As described above, since the voice packet is not retired in the input memory device in the terminal, the delay of the data packet becomes large as the activity of the voice packet becomes vivid thus causing a difference in the delays among packets of different types. The purpose of the traffic quantity detection circuit 406 is to eliminate this defect and to accommodate the voice packet and the data packet in a well matched state. The traffic quantity detection circuit 406 detects the number of voice packets and the number of data packets passing through a repetition period of sending out the voice packets so as to give an instruction whether the voice packet can be sent out or not to a source of information via a signal line 453.

Figure 6:
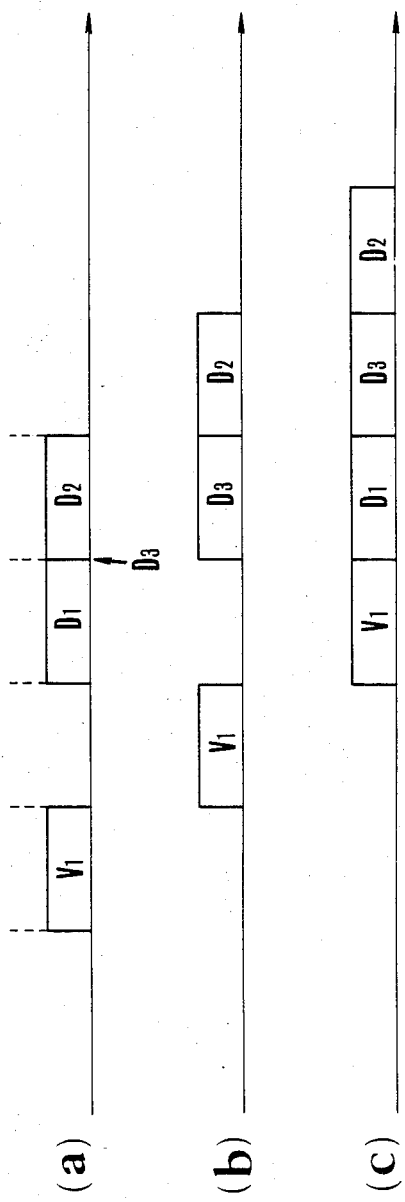

The description already made with reference to FIG. 5 and FIG. 6 is also applicable to the system shown in FIG. 16.

The control of sending out the voice packet in accordance with the traffic quantity passing through a transmission/reception terminal will now be described. Let us assume that the transmission speed of the voice packets is C packets/second, and the repetition period of sending out the voice packet is T seconds. Then the transmission line has a capability of transmitting C·T packets within T seconds. Further, let us denote the number of data packets passing through a transmission/reception terminal within T seconds by $N_D$, and the member of the voice packets by $N_V$. For example, when the following conditions hold, it is assumed that the voice can be sent.

1. When $N_D + N_V < C \cdot T$.
2. When $N_D + N_V = C \cdot T$.

In the latter case, $N_D < \frac{1}{2} C \cdot T$. However these conditions change depending upon such factors as the number of voice terminals, the number of data terminals, the block percentage required for each voice terminal, the maximum delay quantity of the data, etc. Variation in the conditions caused by these exterior factors are also included in the system of this invention.

Figure 17:
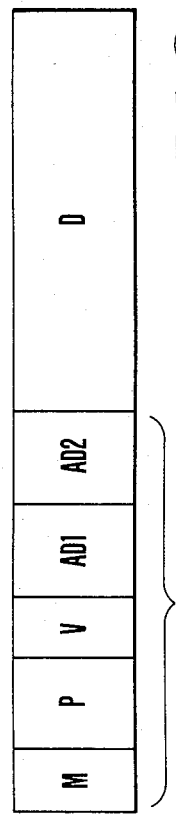
FIG. 17 shows another example of the construction of the packets utilized in the modified system shown in FIG. 16.

FIG. 17 shows one example of the packet construction utilized in the modified system. In FIG. 17, symbols M, P, AD1, AD2 and D have the same meaning as those shown in FIG. 10. Symbol V is a bit showing a voice packet or data packet. When v is "1", it shows a voice packet, and when V is "0" it represents a data packet. Although in this embodiment the bit showing the voice packet or data packet is provided independently of the priority information, it is possible to judge whether a packet is a voice packet or a data packet by using the priority information.

Figure 18:
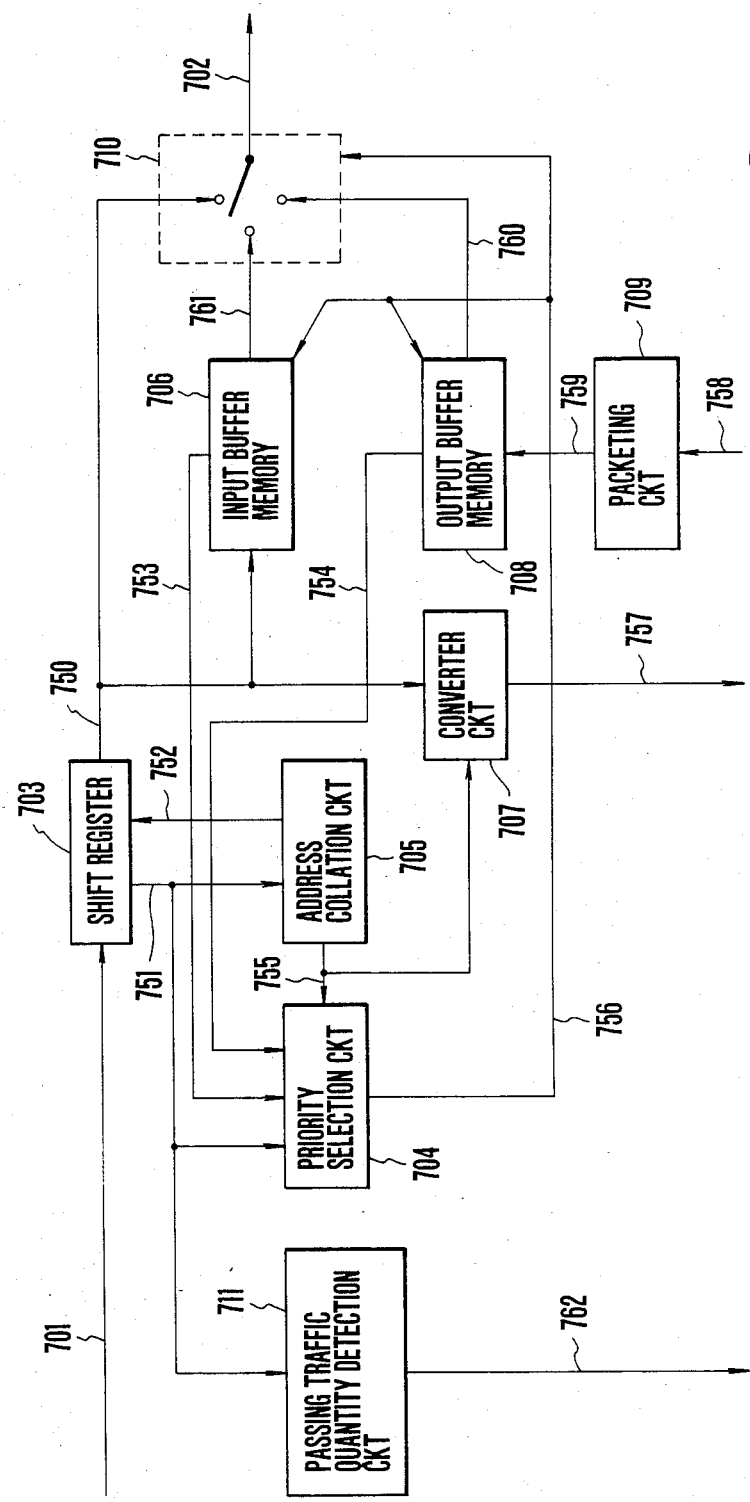
FIG. 18 is a block diagram similar to FIG. 9 in the modified system of FIG. 16.

FIG. 18 is a block diagram showing the modified embodiment of this invention corresponding to the embodiment of this invention shown in FIG. 7. This modification is similar to that shown in FIG. 7 except for a passing traffic quantity detection circuit 711 and the elements other than this detection circuit 711 operate in the same manner as those shown in FIG. 7. The passing traffic quantity detection circuit 711 counts the number of the data packets and the number of the voice packets contained in the header information sent from a signal line 751 during a period of sending out the voice packets so as to detect the traffic quantity passing through a transmission/reception terminal. The result of detection is sent to a voice terminal through a signal line 762.

FIG. 19 shows one example of the construction of the passing traffic quantity detection circuit 711 shown in FIG. 18. A marker bit in the header information inputted from a signal line 1950, and a voice packet bit in the header information inputted from a signal line 1951 are applied to the input terminals of an AND gate circuit 1901 and the output thereof is supplied to a signal line 1954. A clock signal on a signal line 1952 representing the packet period and the output of the AND gate circuit 1901 are inputted to an AND gate circuit 1903 and its output is produced on a signal line 1956. More particularly, when a voice packet arrives at, one clock signal is derived out from the signal on signal line 1956. In the same manner, a voice packet bit on signal line 1951 is inverted by an inverter 1900 and this bit on a signal line 1953 is applied to one input of an AND gate circuit 1902 with the other input terminal supplied with a signal on signal line 1950. The output on a signal line 1955 of the AND gate circuit 1902 and the signal on signal line 1952 are inputted to an AND gate circuit 1904, whereby a clock signal is produced on a signal line 1957 when a data packet is received. Signals on signal lines 1956 and 1957 are applied to counters 1905 and 1906 respectively. Thus, the count of the counter 1905 increases each time a voice packet reaches, while the count of the counter 1906 increases each time a data packet reaches, these counts being outputted on signal lines 1959 and 1960 respectively. The counters 1905 and 1906 are reset by the signal on signal line 1958. The signal on the signal line 1958 produces a pulse at each period of sending out a voice packet. Accordingly, the counters 1905 and 1906 respectively count the number of the voice packets and the number of data packets which pass through a terminal within a period of sending out the voice packet. The signals on signal lines 1959 and 1960 are applied to a latch circuit 1907 and their values are held during the period of sending out the voice packet. The output on signal line 1961 of the latch circuit 1907 represents the passed traffic quantity and is applied to a judging ciruit 1908 which judges whether the voice signal can be sent out or not in accordance with the detected quantity of passed traffic. The result of judgement is sent to the voice terminal via a signal line 1762.

According to this modified embodiment, sending out of the voice signal is controlled with the traffic quantity passing through a terminal, thereby enabling the data packet and the voice packet to be accommodated in the system at a high degree of matching.

FIG. 20 shows a modification of FIG. 16 in which the traffic quantity detection circuit 406 shown in FIG. 16 is substituted by an activity control circuit 406A. This modification is also an example in order to accommodate data and voice terminals in a well matched state.

As described above, in an extreme case, when voice packets having a high degree of priority are continuously inputted, the data packets which have been stored in the input buffer memory device 402 remain stored as they are. However, since the voice packets have the highest degree of priority, they will not be retired to the input buffer memory device in the terminal. For this reason, as the activity of the voice packet increases, the delay of the data packet becomes large whereby packets of different types are treated unfairly. For the purpose of accommodating the voice packet and the data packet in a well matched state and without accompanying the difficulty described above, according to this invention, the sending out of the voice signal is controlled by the system activity.

The method of detecting the system activity is as follows. Thus, prior to the sending out of the voice packet, two types of activity fields, i.e., a data packet activity field and a voice packet activity field are provided in a transmission request packet (ENQ packet) and an affirming/not affirming packet (ACK/NCK packet) which are exchanged between a transmitting terminal and a receiving terminal for effecting communication therebetween. When sending out the ENO packet from the transmitting terminal to the receiving terminal, an active transmitting terminal (a transmitting terminal which is now sending a data packet or a voice packet) increments by one the quantity of the data packet activity field when the data packet is now being sent out, whereas when the voice packet is now being sent out increments by one the quantity of the voice packet activity field. When the ENQ packet arrives at the receiving terminal, it sends to the transmitting terminal the ACK packet or the NCK packet according to the state of the receiving terminal at that time. At this time, the data packet activity field and the voice packet activity field of the ENQ packet are incorporated into the ACK/NCK packet. When the ACK/NCK packet passes through a transmission/reception terminal between a transmitting terminal and a receiving terminal, the active sending terminal increments by one the quantity of the data packet activity field or the voice packet activity field. In this manner, when the ACK/NCK packet returns back to the transmitting termial, the activities of all transmission/reception terminals included in the loop can be determined by detecting the data packet activity field and the voice packet activity field. Such detection of the activities is done by the activity control circuit 406A, which sends to a source of information via a line 453 a signal indicating whether the voice packet can be sent out or not.

The control effected by the circuit shown in FIG. 20 is similar to that described previously in connection with FIGS. 5 and 6.

Accordingly, control of sending out by the system activity of the voice packet will be described as follows. Assume now that the number of the transmission/reception terminals in the system is N, and that transmission speed is denoted by C packets/sec. Further, it is assumed that the sending out rate or speed of the voice packet is denoted by V packets/sec., and that the sending out rate of the data packet is denoted by D packets/sec. For the purpose of simplicity, it is assumed that the sending out rates of the data packet and the voice packet sent out from each transmission/reception terminal are equal.

Furthermore, it is assumed that the number of the active transmission/reception terminals sending out data is denoted by $N_D$, and that the number of the active transmission/reception terminal sending out voices is denoted by $N_V$. Then the system activity $A_S$ is expressed by, $$A_S = \frac{N_D \cdot D + N_V \cdot V}{C}$$

For example, it is assumed that a case in which the following condition stands, voice can be sent out:
(1) $A_S < 1$
(2) $A_S \geq 1$, in which $N_D \cdot D/C < \frac{1}{2}$ It should be understood that the condition varies depending upon such factors as the number of voice terminals, the number of data terminals, block percentage required for voice terminals, the maximum delay amount of the data, etc. Variations of the conditions caused by these factors are also included in the scope of this invention.

One example of the construction of a packet utilized in the system is shown in FIG. 21 in which section (a) shows the construction of an information data packet, and (b) that of a control packet. In FIG. 21, M represents a marker packet. When it is "1" it shows a used packet, and when it is "0" it shows a vacant packet. I is a bit indicative of the type of the packet. When it is "1", it shows an information data packet, whereas when it is "0", it shows a control packet. P shows priority information assigned with a value corresponding to the type of the priority of an information source used in the system. AD1 represents transmission address information and AD2 received address information in which field F represented by D shows an information field. K shows a field indicative of the type of the control packet (for example ENQ packet, ACK packet and NCK packet). DF shows a data packet activity field, and VF a voice packet activity field. As shown by AX, if there is a remaining portion of the control packet, it can be used as an auxiliary information field.

Figure 22:
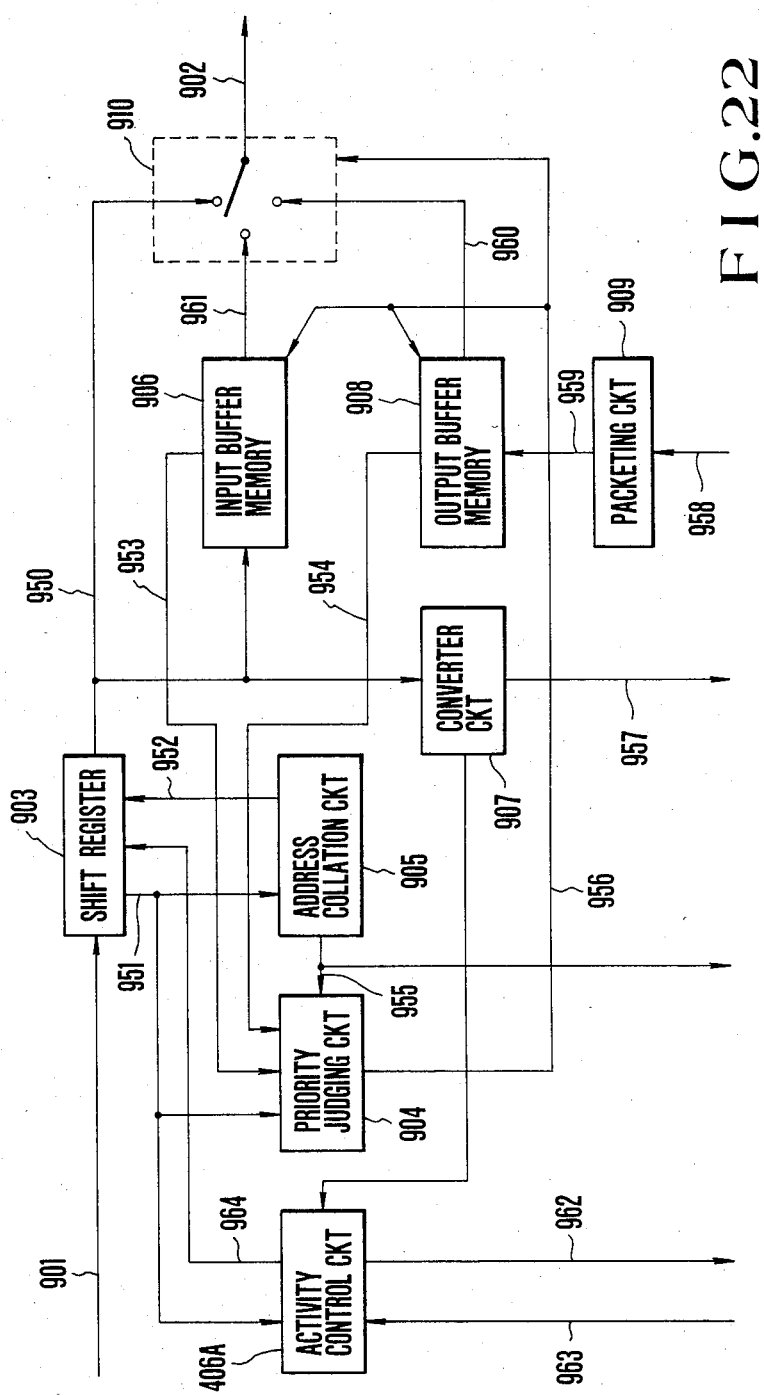
FIG. 22 is a block diagram similar to FIG. 9 in the modified system, of FIG. 20.

FIG. 22 shows a modification of the circuit shown in FIG. 9. The circuit shown in FIG. 22 is identical to that shown in FIG. 9 except for an activity control circuit 406A. The activity control circuit 406A is supplied with the output of a shift register 951 and the output of an address collation circuit 905 through a signal line 955 to detect a control packet from a bit representing the type of the packets of the header information on the signal line 951. When data are sent out from the transmission/reception terminal in accordance with a signal sent from signal line 963 and indicative of the state of the terminal, the activity control circuit 406A increments by one the value of the data packet activity field in the header information, whereas when a voice is being sent out, the activity control circuit 406A increments by one the value of the voice packet activity field and returns the incremented value via a signal line 964 to the shift register 903. When the address information from signal line 955 comprises a control packet circulated once through the loop, the system activity is detected from the data packet activity field and the voice packet activity field of the control packet to output a signal on a signal line 962 indicating whether the voice signal can be sent out or not.

Figure 23:
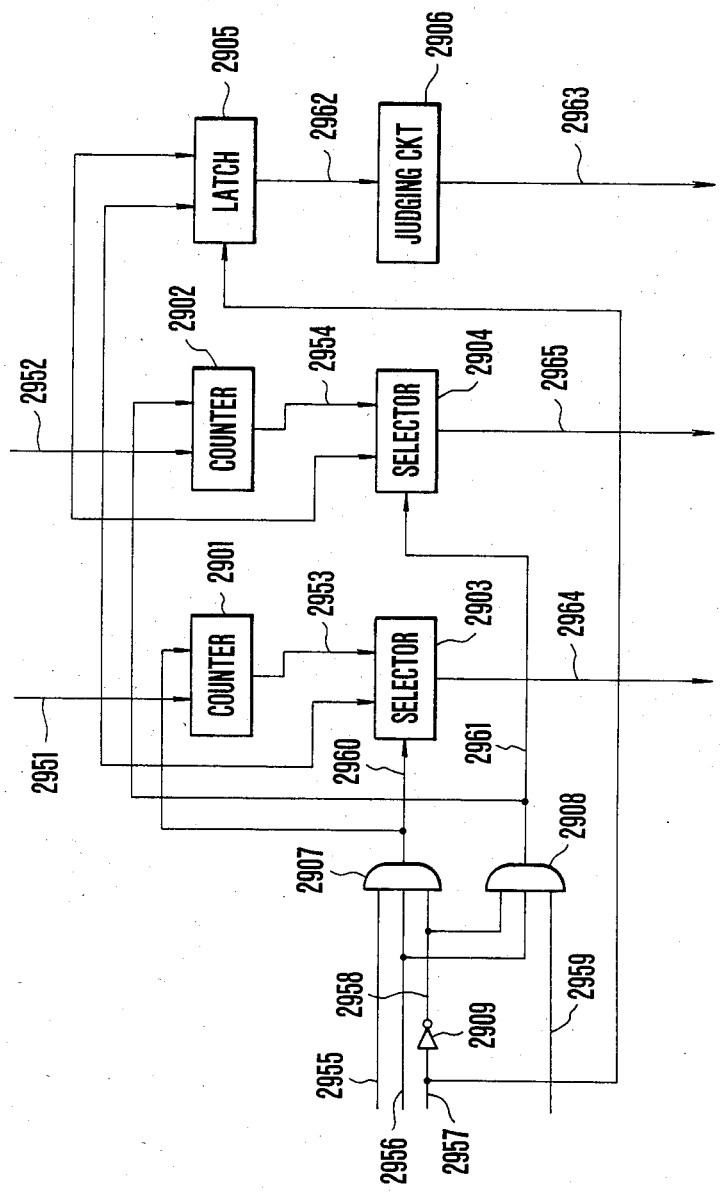
FIG. 23 is a block diagram showing the detail of the activity control circuit shown in FIG. 22.

Details of the activity control circuit 406A is shown in FIG. 23. A data packet sending out bit on signal line 2955 and a control packet bit showing that an input packet from a transmission line is inputted from a signal line 2956 are applied to two input terminals of an AND gate circuit 2907. Further, an address coincidence signal from a signal line 2957 is inverted by an inverter 2909 to produce an address noncoincidence signal on line 2958 which is then applied to the other input terminal of the AND gate circuit 2907. The output of the AND gate circuit 2907 is applied to one input of a counter 2901 with its other input terminal supplied with the data packet activity field in the header information of an input packet coming from a signal line 2951. The sum of both the input signals to the counter 2901 is outputted on a signal line 2953. More particularly, when the signal on the signal line 2960 is "1", the signal on the signal line 2953 has a value obtained by incrementing by one the value of the data packet activity field in the header information. The input packet on signal line 2953 or the data packet activity field signal modified by the terminal condition or the like, and the data packet activity field signal on signal line 2951 are inputted to a selector 2903. When the signal on signal line 2960 is "1", the selector 2903 selects the signal on signal line 2953, whereas when the signal on signal line 2960 is "0", the selector 2903 selects the signal on signal line 2951. The output of the selector 2903 on line 2964 is returned as the data packet activity field of new header information of the input packet. The signal on a signal line 2959 is a voice packet sending out bit, while the signal on a signal line 2952 represents the voice packet activity in the header information of the input packet and actuates a counter 2902 and a selector 2904 in the same manner as when the data packet activity field is changed as above described above. Consequently, the voice packet activity field of new header information of an input packet is outputted on a signal line 2965 and returned to the input packet. When supplied with an address coincidence bit from signal line 2957, a latch circuit 2905 latches a data packet activity field signal and a voice packet activity field signal on signal lines 2951 and 2952 respectively and then outputs these latched signals on a signal line 2962. The signals on the signal line 2962 represent the activities of all transmission/reception terminals which are detected after they have circulated once through the loop and are applied to a judging circuit 2906 which judges whether a voice signal can be sent out or not and produces its result of judgement on a signal line 2963.

In addition to various advantages described above, according to the last described embodiment of this invention, the state of the system can be efficiently supervized (observed) by detecting the system activity during the communication procedure at the time of sending out a voice signal by using the ENQ packet and ACK/NCK packet. By controlling the sending out of the voice signal according to the system activity, it is possible to accommodate the voice packet and the data packet in the system with a high matching performance.

Although in the foregoing description a voice packet and a data packet having two different degrees of priority were described, depending upon the nature of the source of information, the packets may have much more different degrees of priority.

It should be understood that the invention is never limited to the specific embodiments described above and that many changes and modifications will be obvious to one skilled in the art without departing from the spirit and scope of the invention as defined in the appended claims.

What is claimed is:

1. In a loop transmission system of the type including a plurality of transmission/reception terminals and a control terminal which are connected in a loop so as to perform packet communications among respective transmission/reception terminals, the improvement wherein said control terminal includes means for periodically sending out a signal indicative of a leading position of a packet, and means for establishing a loop synchronization such that a transmission line delay created while the packet circulates once through the loop will be an integer multiple of a length of said packet, wherein there is provided means which gives a degree of priority to information signal from each of said transmission/reception terminals in accordance with the type of said information signal, and wherein said transmission/reception terminal comprises first accumulating means for storing and retiring an input packet from an input transmission line; second accumulating means for accumulating a transmission packet sent out from information generating means connected to said transmission/reception terminal, and means for comparing degrees of priorities of said input packet, a delayed packet and said transmission packet for sending out a packet having the highest degree of priority.

2. A loop transmission system of the type including a plurality of transmission/reception terminals and a control terminal which are connected in a loop to effect packet communications among respective transmission/reception terminals, the improvement wherein said control terminal includes means for periodically sending out a signal indicative of a leading position of the packet, and means for establishing synchronization of said loop such that a transmission line delay created while the packet circulates once through the loop will be an integer multiple of a length of said packet, and wherein there are provided means for imparting a first degree of priority to a real time signal among information signals outputted from said transmission/reception terminals, for imparting a second degree of priority to a command packet utilized at a time of starting exchange of said real time signal, and for imparting a third and lesser degrees of priority to data; means provided at a transmitting terminal of said transmission/reception terminals for sending out a transmission request command packet at a time when a request for transmitting said real time signal occurs; means provided at a receiving side terminal for receiving said transmission request command packet and inserting a reply command packet in the same packet position as said transmission request command packet so as to send back said reply command packet; means provided at said transmission side terminal for inserting said real time signal packet in the same packet position as said reply command packet when the same is received within a predetermined interval after sending out said transmission request command packet; and means provided at said receiving side terminal for inserting said real time signal packet in the same packet position as the real time signal packet transmitted from said transmission side terminal and for sending back said real time signal packet, thereby effecting a full dual transmission of said real time signal.

3. In data transmission/reception apparatus for use in a loop transmission system of the type including a plurality of transmission/reception terminals and a control terminal which are connected in a loop, the improvement which comprises means extracting header information from an input packet sent over an input transmission line; address collation means for comparing a received address of said input packet in the header information with an address assigned to said terminal; converter means for converting said input packet into information signal suitable for various apparatus and devices connected to said terminal; input accumulating means for storing and retiring said input packet; packeting means for packeting information signals from said apparatus and devices; output accumulating means supplied with an output from said packeting means; priority selection means comparing degree of priorities of said input packet, of a delayed packet being stored and retired in said output accumulating means, and of a transmission packet sent out from said output accumulating means; and switch means for sending out either one of said input packet, said delayed packet and said transmission packet to an output transmission line; said priority selection means producing a signal that controls the storage and retirement of said input packet, controls delivery of said delayed packet being stored and retired, controls delivery of said transmission packet and controls selection of said switch.

4. A real time signal transmission/reception system for use in a loop transmission system of the type including a plurality of transmission/reception terminals and a control terminal which are connected in a loop for performing packet communications among respective transmission/reception terminals, the improvement which comprises means for extracting header information from an input packet sent over an input transmission line; address collation means for comparing a received address of said input address in said header information with an address assigned to said terminal; converting means for converting said input packet into information signal suitable for real time signal generating device connected to said terminal; input accumulating means for storing and retiring said input packet; packeting means for packeting said real time information signal from said real time signal generating device; output accumulating means for accumulating outputs from said packeting means; command packet generating means for generating a transmission request and a reply command packet; a priority selection circuit which compares degrees of priorities of said input packet, of a delayed packet being stored and retired in said input accumulating means, of a transmission packet sent out from said output accumulating means and of said transmission request and reply command packets; means for judging the type of said command packet based on said header information; a timer for sending a time out signal to said real time signal devices by calculating an interval between sending out of said transmission request signal and reception of said reply command packet; and switch means for sending out to an output transmission line either one of said input packet, said delayed packet, said transmission packet and said command packet; said priority selection means and said command packet judging means producing output signals that control storage and retirement of said input packet, delivery of a delayed packet being stored and retired in said input accumulating means, delivery of said transmission packet and selection of said switch.

5. In a loop transmission system of the type including a plurality of transmission/reception terminals and a control terminal which are connected in a loop so as to perform packet communications among respective transmission/reception terminals, the improvement wherein said control terminal includes means for periodically sending out a signal indicative of a leading position of a packet, and means for establishing a loop synchronization such that a transmission line delay created while the packet circulates once through the loop will be an integer multiple of a length of said packet, wherein there is provided means which gives a first higher degree of priority to a real time information packet from said transmission/reception terminal which is required to have a real time property, and gives a second lower degree of priority to an information packet not required to have the real time property, and wherein said transmission/reception terminal comprises first accumulating means for storing and retiring an input packet from an input transmission line, second accumulating means for accumulating a transmission packet sent out from information generating means connected to said transmission/reception terminal; means for comparing degrees of priorities of said input packet, of a delayed packet outputted from said first accumulating means and of said transmission packet so as to send out a packet having the highest degree of priority to an output transmission line; means which when real time information constituted by a plurality of real time information packets having the first higher degree of priority is sent out from a first transmission/reception terminal, prior to sending out a real time message, detects traffic quantities of the real time information and the data packets in accordance with the number of real time information packets and the data packets passing through said first transmission/reception terminal during a repetition period of sending out said real time information packet; and means, which when said detected traffic quantities satisfy a predetermined condition, begins to send out said real time information message.

6. The loop transmission system according to claim 5 wherein said traffic quantity detecting means comprises a first counter counting the number of the voice packets, a second counter counting the number of the data packets which pass through a terminal in a period of sending out the voice packet, a latch circuit latching outputs of said first and second counters, and a judging circuit which judges whether the voice signal can be sent out or not in accordance with the output of said latch circuit.

7. In a loop transmission system of the type including a plurality of transmission/reception terminals and a control terminal which are connected in a loop so as to perform packet communications among respective transmission/reception terminals, the improvement wherein said control terminal includes means for periodically sending out a signal indicative of a leading position of a packet, and means for establishing a loop synchronization such that a transmission line delay created while the packet circulates once through the loop will be an integer multiple of a length of said packet, wherein there is provided means which gives a first higher degree of priority to an information packet from said transmission/reception terminal which is required to have a real time property, and gives a second lower degree of priority to an information packet not required to have the real time property, and wherein said transmission/reception terminal comprises first accumulating means for storing and retiring an input packet from an input transmission line; second accumulating means for accumulating a transmission packet sent out from information generating means connected to said transmission/reception terminal; means for comparing degrees of priorities of said input packet, of a delayed packet outputted from said first accumulating means and of said transmission packet so as to send out a packet having the highest degree of priority to an output transmission line; means which when a real time information message constituted by a plurality of real time information packets is sent out from a first transmission/reception terminal, prior to sending out said real time information message, sends out a control packet; means provided for a transmission reception terminal which is sending out the first information packet among the transmission/reception terminals included in the loop, for increasing by one a value of a first control field in said control packet when the control packet passes through said transmission/reception terminal sending out said first information packet; means provided for another transmission/reception terminal sending out a second information packet, for increasing a value of a second control field in said control packet by an amount corresponding to a transmission speed when said control packet passes through said another transmission/reception terminal; means for detecting activities of the real time information packet and the data packet based on the first and second control fields of said control packet when the same returns back to said first transmission/reception terminal after the control packet has circulated once through said loop; and means for causing said first transmission/reception terminal to begin to send out said real time information message when said detected activities satisfy a predetermined condition.

* * * * *